US010984242B1

(12) United States Patent
Atlas et al.

(10) Patent No.: US 10,984,242 B1
(45) Date of Patent: Apr. 20, 2021

(54) VIRTUAL PROXIMITY COMPASS FOR NAVIGATING ARTIFICIAL REALITY ENVIRONMENTS

(71) Applicant: Facebook Technologies, LLC, Menlo Park, CA (US)

(72) Inventors: Charlene Mary Atlas, Redmond, WA (US); Chad Austin Bramwell, Sammamish, WA (US); Mark Terrano, Redmond, WA (US); Caryn Vainio, Hobart, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/561,818

(22) Filed: Sep. 5, 2019

(51) Int. Cl.
| | |
|---|---|
| *G06K 9/00* | (2006.01) |
| *G02B 27/01* | (2006.01) |
| *G06F 16/58* | (2019.01) |
| *H04W 4/029* | (2018.01) |
| *G06T 7/70* | (2017.01) |
| *H04W 4/021* | (2018.01) |
| *G06T 19/00* | (2011.01) |

(52) U.S. Cl.
CPC ..... *G06K 9/00671* (2013.01); *G02B 27/0172* (2013.01); *G06F 16/5866* (2019.01); *G06T 7/70* (2017.01); *G06T 19/006* (2013.01); *H04W 4/021* (2013.01); *H04W 4/029* (2018.02)

(58) Field of Classification Search
CPC .......................... G06K 9/00671; G06T 19/006

USPC ......................................................... 345/633
See application file for complete search history.

(56) References Cited

U.S. PATENT DOCUMENTS

| | | | | |
|---|---|---|---|---|
| 2014/0063058 | A1* | 3/2014 | Fialho | G06T 19/00 345/633 |
| 2014/0267400 | A1* | 9/2014 | Mabbutt | G06F 1/163 345/633 |
| 2018/0274936 | A1* | 9/2018 | Choi | G01C 21/3602 |

* cited by examiner

*Primary Examiner* — Shivang I Patel
(74) *Attorney, Agent, or Firm* — Shumaker & Sieffert, P.A.

(57) ABSTRACT

An artificial reality system includes a head mounted display (HMD) and a compass generator that generates a proximity compass used to locate virtual or physical elements within an artificial reality environment. The artificial reality system can render a proximity compass around or in proximity to a virtual device, a virtual or physical object, or at a designated location. The proximity compass includes graphical elements that can represent virtual experiences (applications, games, utilities etc.), physical or virtual objects, and physical or virtual locations within the artificial reality environment. The positioning of a graphical element within the proximity compass represents a direction of the associated experience, object or location with respect to the HMD. The graphical elements within the proximity compass may rotate around a virtual hand-held device when the user changes the orientation of the hand-held device. The graphical elements may include data that identifies the experience associated with the graphical element.

27 Claims, 15 Drawing Sheets

VIRTUAL PROXIMITY COMPASS FOR NAVIGATING ARTIFICIAL REALITY ENVIRONMENTS

TECHNICAL FIELD

This disclosure generally relates to artificial reality systems, such as virtual reality, mixed reality, and/or augmented reality systems, and more particularly, to proximity compasses for artificial reality systems.

BACKGROUND

Artificial reality systems are becoming increasingly ubiquitous with applications in many fields such as computer gaming, health and safety, industrial, training and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof.

Typical artificial reality systems include one or more devices for rendering and displaying content to users. As one example, an artificial reality system may incorporate a head mounted display (HMD) worn by a user and configured to output artificial reality content to the user. The artificial reality content may include completely-generated content or generated content combined with captured content (e.g., real-world video and/or images). During operation, the user may utilize a hand-held controller to interact with applications or interact with the artificial reality system.

SUMMARY

In general, this disclosure describes artificial reality systems and, more specifically, a proximity compass for an artificial reality system that includes a head mounted display and optionally, a hand-held device having a touch sensitive surface. The hand-held device may be a proprietary device provided by the artificial reality system manufacturer (e.g., a peripheral device or co-processing device) or it may be a user's personal, stand-alone device (e.g., a smart phone). The artificial reality system tracks the position and orientation of the hand-held device within the artificial reality environment. The artificial reality system may access data that includes the location and identification of various elements within an artificial reality environment. The elements may include various user experiences (e.g., artificial reality applications, other users, etc.) in the artificial reality environment. The artificial reality environment may comprise a large-scale, three-dimensional (3D) virtual environment in which the different virtual (or real) elements are positioned at different locations across a 3D physical environment, for example, an entire floor of a physical building.

A technical problem with conventional artificial reality systems is that they do not provide any way for a user to navigate the virtual portions of the artificial reality environment that are not within the user's current line of sight. For example, some or all of the artificial reality environment displayed to the user is virtual, and therefore not real. Further, the artificial reality environment may be a large-scale environment having real or virtual walls or other barriers that place some or all of the artificial reality environment out of the view presented on the HMD. As an example, the artificial reality environment may be overlaid on a large-scale physical environment such as a physical building having multiple floors and rooms, with virtual experiences at locations corresponding to various rooms and floors throughout the building. The user thus may not be able to determine where various virtual experiences are located within portions of the artificial reality environment that are beyond the view currently presented to the user because the user may not be familiar with physical or virtual portions of the artificial reality environment. This can lead to user dissatisfaction and frustration with the operation of the artificial reality system.

As a technical solution to the aforementioned technical problem, some aspects include a compass generator for an artificial reality system that generates a proximity compass used to locate virtual (or real) elements within an artificial reality environment. According to some aspects of the disclosed techniques, when a hand-held device appears in the field of view of cameras or sensors of an HMD, the artificial reality system renders a virtual device representing the hand-held device. The artificial reality system may also render a proximity compass around some or all the virtual device. Other conditions instead of, or in addition to, the presence of the hand-held device can cause the proximity compass to be displayed. In alternative aspects of the disclosure, the proximity compass can be anchored to a physical object, a virtual object, or anchored to a particular offset or location within the artificial reality environment.

The proximity compass includes graphical elements that represent different entities in the artificial reality environment. For example, entities may include virtual experiences (applications, games, utilities etc.), virtual objects, and virtual locations within the artificial reality environment. Further, entities may include physical objects and physical locations that can be tracked or maintained in a map accessible by the HMD. Moreover, entities may include other users within the artificial reality environment. The positioning of a graphical element within the proximity compass represents a direction to a target location of the associated entity with respect to the HMD. The graphical elements within the proximity compass may rotate around the virtual hand-held device when the user changes the orientation of the hand-held device. The graphical elements may include data that identifies the entity associated with the graphical element and/or the distance from the HMD to the entity. The graphical elements representing entities may have shapes, colors, and other attributes that identify the type of entity (e.g., application, game, utility, physical or virtual object, another user etc.) and whether the user can currently interact with the entity represented by the graphical element. For example, a grayed-out graphical element may indicate that the entity associated with the graphical element is currently too far away for the user to interact with or is currently out of the user's line of sight.

The orientation of the hand-held device may be used to determine how the hand-held device functions. As an example, when the artificial reality system detects that the hand-held device is in a portrait orientation, the hand-held device may be used as the proximity compass. When the artificial reality system detects that the hand-held device is in a landscape orientation, the hand-held device may be used as part of a user interface to interact with the currently selected virtual experience or with another user.

The aspects described above and further aspects described below can provide a technical improvement over conventional artificial reality system implementations, and can provide one or more practical applications, such as enabling an artificial reality system to provide a proximity compass that enables a user to quickly and easily locate and navigate to target locations associated with various entities that may be represented within the artificial reality system or accessible to the artificial reality system.

In one or more example aspects, an artificial reality system includes a head mounted display (HMD) configured to output artificial reality content associated with a three-dimensional (3D) virtual environment; a pose tracker configured to determine an HMD pose representing an estimated position and orientation of the HMD within a 3D physical environment; a hand-held device tracker configured to determine a hand-held device pose representing an estimated position and orientation of a hand-held device; a compass generator configured to: determine a direction from the estimated position of the HMD to a location within the 3d physical environment corresponding to a location of a virtual experience within the 3D virtual environment, and generate a proximity compass, the proximity compass comprising at least one graphical element associated with the virtual experience and positioned within the proximity compass according to the direction; and a rendering engine configured to render the artificial reality content and the proximity compass based, at least in part, on the HMD pose and the hand-held device pose.

In one or more further example aspects, a method includes determining, by a pose tracker of an artificial reality system including a head mounted display (HMD) configured to output artificial reality content associated with a three-dimensional (3D) virtual environment, an HMD pose representing an estimated position and orientation of the HMD within a 3D physical environment; determining, by a hand-held device tracker of the artificial reality system, a hand-held device pose representing an estimated position and orientation of a hand-held device; determining, by a compass generator of the artificial reality system, a direction from the estimated position of the HMD to a location within the 3D physical environment corresponding to a location of a virtual experience within the 3D virtual environment; generating, by the compass generator, a proximity compass, the proximity compass comprising at least one graphical element associated with the virtual experience and positioned within the proximity compass according to the direction; and rendering, by the artificial reality system, the artificial reality content and the proximity compass based, at least in part, on the HMD pose and the hand-held device pose.

In one or more additional example aspects, a non-transitory, computer-readable medium comprises instructions that, when executed, cause one or more processors of an artificial reality system to determine artificial reality content associated with a three-dimensional (3D) virtual environment; determine an HMD pose representative of an estimated position and orientation of the HMD within a 3D physical environment; determine a hand-held device pose representative of an estimated position and orientation of a hand-held device; determine a direction from the estimated position of the HMD to a location within the 3d physical environment corresponding to a location of a virtual experience within the 3D virtual environment; generate a proximity compass, the proximity compass comprising at least one graphical element associated with the virtual experience and positioned within the proximity compass according to the direction; and render the artificial reality content and the proximity compass based, at least in part, on the HMD pose and the hand-held device pose.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1A:
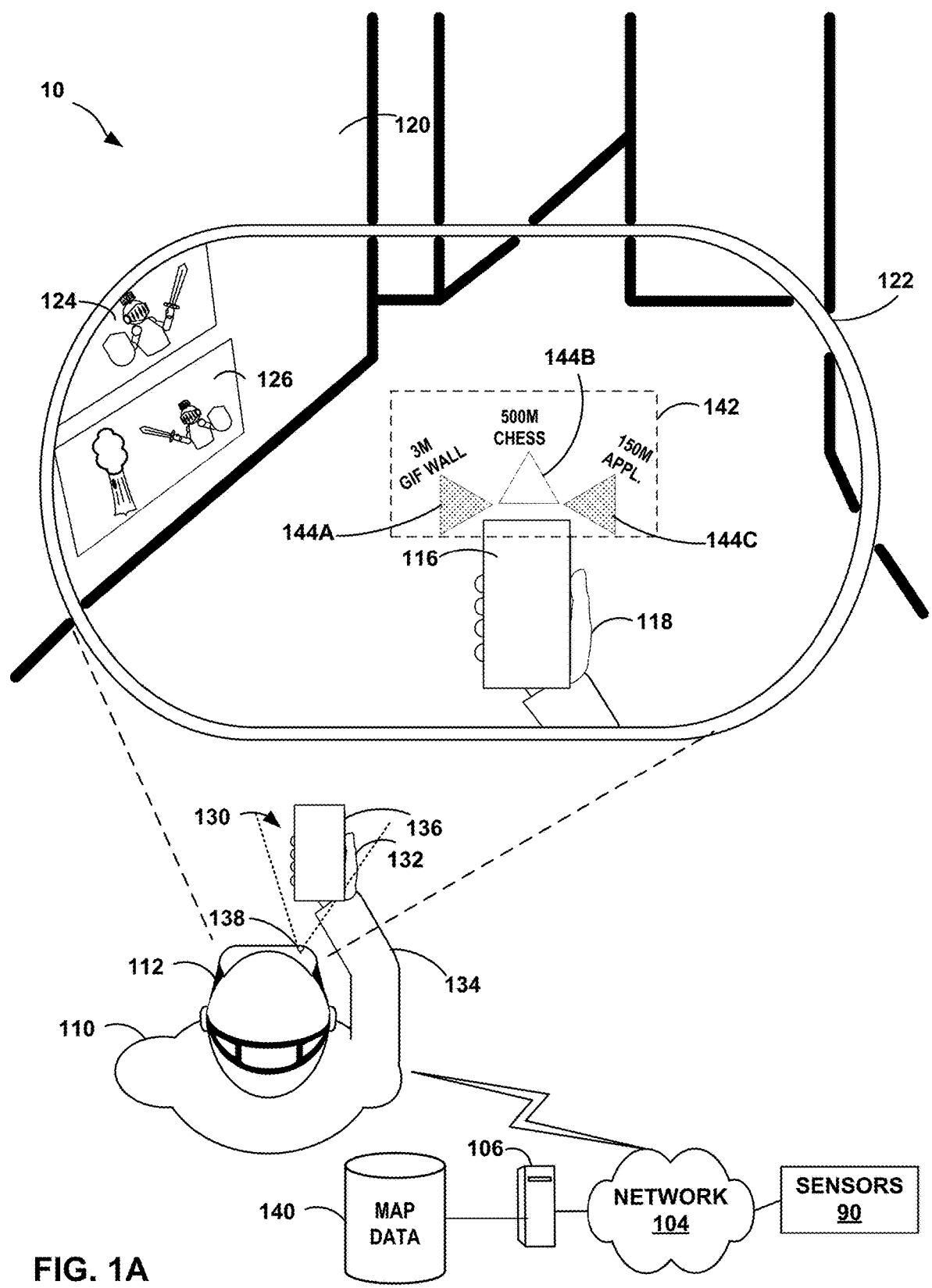
FIG. 1A is an illustration depicting an example artificial reality system that generates and displays a proximity compass for navigating an artificial reality environment in accordance with the techniques of the disclosure.

FIG. 1A is an illustration depicting an example artificial reality system 10 that generates and renders a proximity compass 142 indicating target locations of entities in an artificial reality environment in accordance with the techniques of the disclosure. As noted above, entities can include virtual experiences (applications, games, utilities etc.), virtual objects within the artificial reality environment, physical objects, physical locations, and other users within the artificial reality environment. The entities can be entities that are visible within the artificial reality environment (i.e., rendered as part of artificial reality content displayed on an HMD), or they can be entities that are outside of the visual range of the artificial reality environment (i.e., not rendered as part of the artificial reality content). In some implementations, artificial reality system 10 generates and renders virtual content items 124, 126 (e.g., digital photos or other digital images, applications, live-streams, videos, text, a web-browser, drawings, animations, representations of data files, or any other visible media) for a virtual experience. In the example illustrated in FIG. 1A, a proximity compass 142 includes graphical elements (e.g., graphical elements 144A, 144B, 144C, referred to generically as "graphical element 144") that indicate a direction to target locations within the artificial reality environment of entities associated with the graphical elements. In the example illustrated in FIG. 1A, a virtual experience labeled "GIF wall" includes virtual content items 124 and 126 that can be GIF images, JPEG images, or other digital images that are projected onto the image of a physical wall 120. Graphical element 144A is associated with the GIF wall virtual experience and is rendered at a position within the virtual compass 142 that indicates the direction to the GIF wall virtual experience. Similarly, graphical element 144B is associated with a virtual experience comprising a chess game and is rendered at a position within the virtual compass indicating a direction to a location where the user 110 can interact with the chess game. Additionally, graphical element 144C is associated with a virtual experience comprising an application and is rendered at a position within the virtual compass 142 indicating a direction to a location where the user 110 can interact with the application.

In addition to indicating a direction to a location of a virtual experience, a graphical element 144 can optionally include an indication of the distance from the user's location (e.g., the position of the HMD 112) to the location of the virtual experience as shown in FIG. 1A. Further, a graphical element 144 can be highlighted to indicate whether the user 110 can currently interact with the virtual experience. In the example illustrated in FIG. 1A, graphical elements 144A and 144C are highlighted to indicate that user 110 can currently interact with the GIF wall and application virtual experiences. Graphical element 144B is not highlighted indicating that the user cannot currently interact with the chess game virtual experience.

In the example proximity compass 142 shown in FIG. 1A, triangles have been used as graphical elements 144 associated with virtual experiences. Other shapes and types of graphical elements can be used as well. For example, an icon associated with an application or game can be used as a graphical element. Additionally, a shape, color, or other display attribute of a graphical element can indicate the type of virtual experience (game, application, utility etc.) associated with the element.

In the example of FIG. 1A, artificial reality system 10 includes head mounted device (HMD) 112 and a hand-held device 136. As shown, HMD 112 is typically worn by user 110 and includes an electronic display and optical assembly for presenting artificial reality content 122 to user 110. In addition, HMD 112 includes one or more motion sensors (e.g., accelerometers) for tracking motion of the HMD 112 and may include one or more image capture devices 138, e.g., cameras, infrared (IR) detectors, Doppler radar, line scanners and the like, for capturing image data of the surrounding physical environment.

In some aspects, hand-held device 136 is a proprietary device that may be specifically designed to operate with the artificial reality system 10. For example, hand-held device 136 may be a peripheral device that coexists with HMD 112 and, in some examples, operates as an auxiliary input/output device for HMD 112 in the artificial reality environment. In some examples, the peripheral device may operate as an artificial reality co-processing device to which some of the functions of HMD 112 are offloaded. The hand-held device 136 may include a touch sensitive surface that senses a position of where a user 110 touches, or is in close proximity to, the touch sensitive surface. In some aspects, hand-held device 136 is not proprietary and is not designed specifically to operate with the artificial reality system 10. As an example, the hand-held device 136 may be a smart phone operated by user 110 that may have application software installed to provide a software interface to the artificial reality system 10.

In some example implementations HMD 112 operates as a stand-alone, mobile artificial reality system that receives input from hand-held device 136 and acquires location information for virtual experiences from map data 140. In other implementations, an artificial reality system 10 can optionally include a console 106 and/or one or more external sensors 90 in addition to, or instead of HMD 112, where the console 106 receives input from hand-held device 136. In the example illustrated in FIG. 1A, console 106 is shown as a single computing device, such as a gaming console, workstation, a desktop computer, server computer, or a laptop. In other examples, console 106 may be distributed across a plurality of computing devices, such as a distributed computing network, a data center, or a cloud computing system. Console 106, HMD 112, and sensors 90 may, as shown in this example, be communicatively coupled via network 104, which may be a wired or wireless network, such as WiFi, a mesh network or a short-range wireless communication medium.

Map data 140 stores the location of entities within the artificial reality environment generated and rendered by artificial reality system 10. In addition, map data 140 may include locations of other users within the artificial reality environment. Further, map data 140 may include a layout of a 3D physical environment. For example, the map data 140 may include a layout of the locations of floors, rooms and physical objects of a real-world building onto which various virtual experiences may be overlaid. The location information in map data 140 may be maintained in various ways. In some aspects, the location information for entities pointed at by the proximity compass 142 may be relative to a position in a real-world (i.e., physical) building, stadium, structure, park, or other relatively large scale physical environment (e.g., an environment larger than a single room). In further aspects, the location information may be absolute positioning information, such as latitude and longitude information.

In some aspects, map data 140 may be communicably coupled with console 106. In other aspects, map data 140 may be communicably coupled with HMD 112. In further aspects, HMD 112 may access map data 140 via a server (e.g., a database server) communicatively coupled to HMD 112.

In general, artificial reality system 10 uses information captured from a real-world, 3D physical environment to render artificial reality content 122 for display to user 110. In the example of FIG. 1A, user 110 views the artificial reality content 122 constructed and rendered by an artificial reality application executing on HMD 112 and/or console 106. As noted above, artificial reality content 122 may include a virtual experience such as a gaming application, a utility application, an information presentation application, or any other application that can contribute image data for presentation as part of artificial reality content 122. Thus, in some examples, artificial reality content 122 may comprise a mixture of real-world imagery and virtual objects, e.g., mixed reality and/or augmented reality. In other examples, artificial reality content 122 may be, e.g., a video conferencing application, a navigation application, an educational application, training or simulation applications, or other types of applications that implement artificial reality.

During operation, the artificial reality application constructs artificial reality content 122 for display to user 110 by tracking and computing pose information for a frame of reference within a 3D virtual environment, typically a viewing perspective of HMD 112. Using HMD 112 as a frame of reference, and based on a current field of view 130 as determined by a current estimated pose of HMD 112 and a current estimated pose for hand-held device 136, the artificial reality application renders 3D artificial reality content which, in some examples, may be rendered for display by the HMD 112 so as to appear to be overlaid, at least in part, upon the real-world, 3D physical environment of user 110 visible via the display of the HMD 112. During this process, the artificial reality application uses sensed data received from HMD 112 and the hand-held device 136, such as movement information and user commands, and, in some examples, data from any external sensors 90, such as external cameras, to capture 3D information within the real-world, physical environment, such as motion by user 110 and/or the motion and orientation of the hand-held device 136. Based on the sensed data, the artificial reality application determines a current pose for the frame of reference of HMD 112, a current pose for the hand-held device 136 and, in accordance with the current poses of the HMD 112 and hand-held device 136, renders the artificial reality content 122 and proximity compass 142 for presentation on an electronic display of HMD 112 at a location proximate to an image 116 of the hand-held device 136. The image 116 of the hand-held device 136 may be based on actual image data of hand-held device 136 as captured by an image capture device 138 of the HMD 112, or the image 116 may be a virtual representation of the hand-held device 136 that is generated by the artificial reality system 10 based on the pose of the hand-held device 136. As the user moves through the 3D virtual environment or changes the position or orientation of the hand-held device 136, the proximity compass 142 may be rendered on the display of HMD 112 so as to rotate around the image 116 of the hand-held device 136.

More specifically, as further described herein, image capture devices 138 of HMD 112 capture image data representative of objects in the real-world, 3D physical environment that are within a field of view 130 of image capture devices 138. These objects can include the hand-held device 136. Field of view 130 typically corresponds with the viewing perspective of HMD 112. In some examples, such as the illustrated example of FIG. 1A, the artificial reality application renders the portions of hand 132 of user 110 that are within field of view 130 as an image 118 of the hand 132 within the artificial reality content 122. The image 118 of the hand 132 may be based on actual image data of hand 132 as captured by an image capture device 138 or it may be a virtual representation of hand 132 generated by the artificial reality system 10 based on the position and orientation of the hand 132 or hand-held device 136.

Direction and distance calculations used to position and display graphical elements 144 within proximity compass 142 may be based on coordinate system translations between a coordinate system based on a 3D physical environment as maintained in map data 140 and a coordinate system of a 3D virtual environment based on the frame of reference of an HMD 112. For example, a position of the HMD 112 within the 3D physical environment may be used to translate the 3D physical environment positions in map data 140 to 3D virtual environment positions referenced within artificial reality system 10. In some aspects, the direction and distance calculation to the target location may utilize a position of the HMD 112 as a source location. However, in some aspects, the direction and distance calculation may use other locations as a source location. Examples of such source locations include a location where the proximity compass 142 is rendered (e.g., when anchored to a physical or virtual object), a location from the hand-held peripheral device 136 (regardless of whether the proximity compass is anchored to it at the time or not), and a location that may be a region defined around the user as an entity and designated as the "user location."

A distance, when rendered, may be represented using a variety of different models. In the example illustrated in FIG. 1A, the distance is represented as a 2D length in meters. In some aspects, the distance can be represented as a 3D length, a polar length, estimated number of steps, estimated number of miles on a road, etc. Further, the distance may be a "direct line" distance, or it may be a distance along a path to the target location (e.g., a path along a road that is not a direct line to the target location).

Accordingly, the techniques of the disclosure provide specific technical improvements to the computer-related field of rendering and displaying content by an artificial reality system. For example, artificial reality systems as described herein may provide a high-quality artificial reality experience to a user, such as user 110, of the artificial reality application by generating and rendering a proximity compass 142 having graphical elements 144 that indicate the direction to locations within the artificial reality environment that correspond to entities such as virtual experiences available to the user 110. The artificial reality environment may include images or representations of real-world structures such as walls, doors, windows, columns, etc. that may be integrated with virtual objects and virtual experiences within the artificial reality environment to create a multi-experience virtual world. The artificial reality environment may be large enough that the proximity map 142 is desirable to assist the user to navigate to the entities within the artificial reality environment.

Figure 1B:
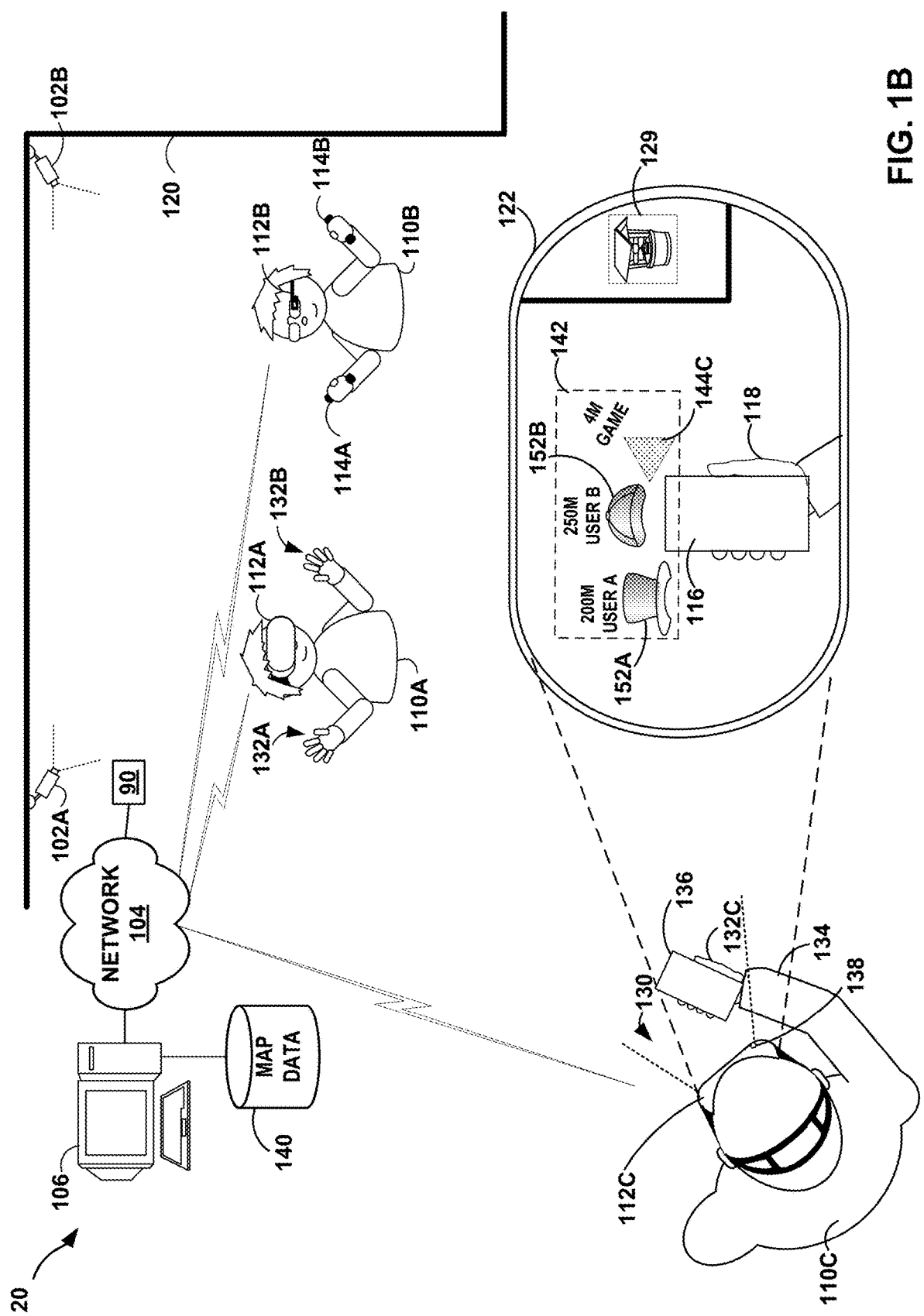
FIG. 1B is an illustration depicting another example artificial reality system that generates and displays a proximity compass for navigating an artificial reality environment in accordance with the techniques of the disclosure.

FIG. 1B is an illustration depicting another example artificial reality system 20 that generates and renders a proximity compass 142 proximate to an image 116 of a hand-held device 136 in accordance with the techniques of the disclosure. Similar to artificial reality system 10 of FIG. 1A, in some examples, artificial reality system 20 of FIG. 1B may generate and render at least one of graphical elements 144 (e.g., graphical element 144C) that indicates a direction (and optionally, a distance) to an entity within an artificial reality environment based on poses determined for HMD 112C and hand-held device 136.

In the example of FIG. 1B, artificial reality system 20 includes external cameras 102A and 102B (collectively, "external cameras 102"), HMDs 112A-112C (collectively, "HMDs 112"), controllers 114A and 114B (collectively, "controllers 114"), hand-held device 136, console 106, and sensors 90. As shown in FIG. 1B, artificial reality system 20 represents a multi-user environment in which an artificial reality application executing on HMDs 112 and/or console 106 presents artificial reality content to each of users 110A-110C (collectively, "users 110") based on a current viewing perspective of a corresponding frame of reference for the respective user. That is, in this example, the artificial reality application constructs artificial content by tracking and computing pose information for a frame of reference for each of HMDs 112. Artificial reality system 20 uses data received from HMDs 112, controllers 114, hand-held device 136, and optionally, cameras 102, to capture 3D information within the real-world environment, such as motion by users 110 and/or tracking information with respect to controllers 114 and hand-held device 136 for use in computing updated pose information for the HMDs 112, hand-held device 136, and controllers 114 within a corresponding frame of reference of HMDs 112. As one example, HMD 112C may, based on a current viewing perspective determined for HMD 112C, generate artificial reality content 122 having a virtual object 129 representing a game virtual experience. Virtual object 129 can be rendered by HMD 112C so as to appear to be spatially overlaid upon real-world objects such as walls or other surfaces of a 3D physical environment within the field of view 130 of HMD 112C. Further, from the perspective of HMD 112C, artificial reality system 20 renders a proximity compass 142 that includes a graphical element 144C indicating a direction to a location with the artificial reality environment of the game represented by virtual object 129. In the example illustrated in FIG. 1B, proximity compass 142 also includes user graphical elements 152A and 152B that are associated with users 110A and 110B respectively. Similar to the graphical element 144, a user graphical element 152 may be generated and rendered within proximity compass 142 to indicate a direction and optionally a distance to the location of users 110A and 110B. The location of users 110A and 110B may be based on estimated positions for users 110A, 110B. The estimated position may be maintained in map data 140. In the example illustrated in FIG. 1B, the user graphical elements 152A and 152B are hats representing the users 110A and 11B. In other examples, a user graphical element 152 may be an avatar or other graphical element associated with a user.

Each of HMDs 112 concurrently operates within artificial reality system 20. In the example of FIG. 1B, each of users 110 may be a "player" or "participant" in a same virtual experience such as the game represented by virtual object 129. Alternatively, some or all of users 110 may be participating in different virtual experiences. Further, any of users 110 may be a "spectator" or "observer" in the artificial reality environment. HMD 112C may operate substantially similar to HMD 112 of FIG. 1A by receiving input from hand-held device 136 held by hand 132C of user 110C, and rendering an image 118 of the hand 132C and an image 116 of the hand-held device 136 within artificial reality content 122 when the hand-held device 136 held by hand 132C is within field of view 130. HMD 112C may also render proximity compass 142 based on a determined pose of hand-held device 136. Hand-held device 136 may be in communication with HMD 112C using near-field communication or short-range wireless communication such as Bluetooth, using wired communication links, or using other types of communication links.

HMD 112A and HMD 112B may also operate substantially similar to HMD 112 of FIG. 1A. HMD 112B may receive user inputs from controllers 114A and 144B held by user 110B. Further, HMD 112A and HMD 112B may receive input from hand-held devices like hand-held device 136 held by user 110C.

In some aspects, the graphical elements 144 may be rendered in a single plane as shown in FIGS. 1A and 1B. In further aspects, the graphical elements 144 may be rendered above or below the plane of the proximity compass 142 in accordance with an elevation of the location of an entity associated with a graphical element 144. For example, a graphical element 144 associated with a virtual experience located on a floor above the current floor of the user of HMD 112 may be rendered above the plane of proximity compass 142, while a graphical element 144 associated with a virtual experience located on a floor below the current floor of the user of HMD 112 may be rendered below the plane of the proximity compass 142. In still further aspects, the graphical elements 144 may have indicia such as lines, shapes, or color to indicate an elevation of the target location of the entity associated with a graphical element. In some aspects, the elevation of a target location of an entity may also be indicated by opacity or highlighting of an associated graphical element 144

The graphical elements 144 that appear in a proximity compass 142 may be determined according to one or more filters applied to properties or attributes of the entities represented by the graphical elements 144. The graphical elements 144 may be filtered based on the type of entity (e.g., virtual experience, physical experience, virtual or physical object, other users, etc.) associated with a graphical element 144. For example, the graphical elements may be filtered to include a type of business (e.g., a restaurant) thereby excluding from the proximity compass graphical elements associated with entities that are not restaurants. Similarly, the graphical elements 144 may be filtered based on user preferences. For example, if a user indicates a preference for Brand A gas stations over other brands of gas stations, the proximity compass 142 may show graphical elements associated with locations of Brand A gas stations and exclude from the proximity compass 142 gas stations other than those of Brand A. Further, the graphical elements may be filtered according to distance. The distance from the user to locations of virtual experiences, physical experiences, virtual objects, physical objects, etc. may be used to determine the graphical elements 144 displayed within a proximity compass 142. As an example, a user may choose to display only those graphical elements 144 that are associated with entities that are within 500 meters of the user's current location. Combinations of filters may be applied simultaneously. For example, the graphical elements 144 may be filtered according to restaurants that are within five miles of the user's current location.

Application of a filter can be initiated in various ways. In some aspects, a filter may be initiated by an application executed by the artificial reality system. For example, the user may select a colleague's desk to navigate to based on a map or contacts application. In some aspects, a filter may be initiated by a user command. For example, the user may issue a command to "show me the best burger places near me" resulting in the proximity compass including graphical elements associated with restaurants that serve hamburgers and are within a predefined or configurable distance from the user's current location. As noted above, filters may also be performed according to a user's preferences.

Figure 2A:
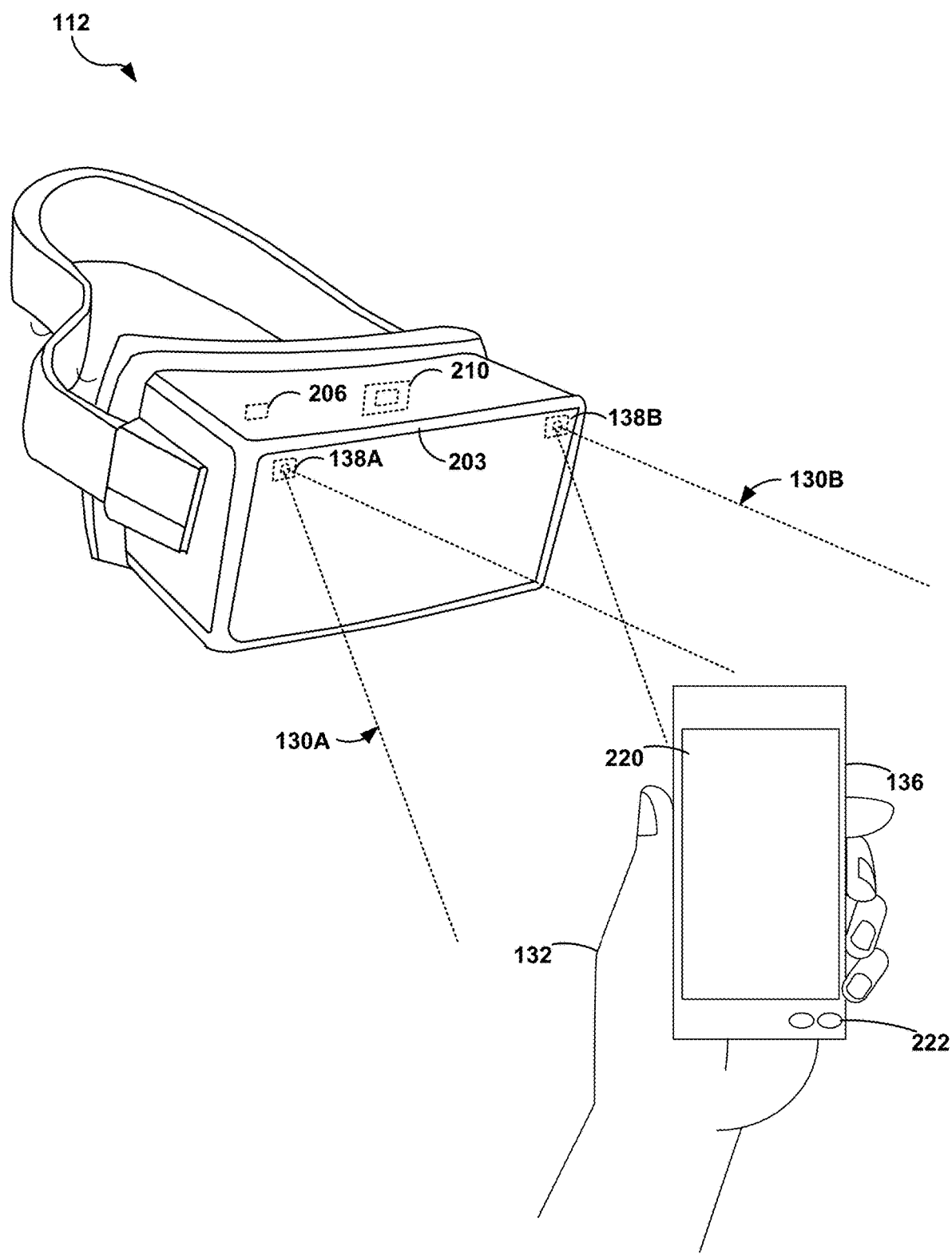
FIG. 2A is an illustration depicting an example HMD that operates in accordance with the techniques of the disclosure.

FIG. 2A is an illustration depicting an example HMD 112 and hand-held device 136 configured to operate in accordance with the techniques of the disclosure. HMD 112 of FIG. 2 may be an example of any of HMDs 112 of FIGS. 1A and 1B. HMD 112 may operate as a stand-alone, mobile artificial realty system configured to implement the techniques described herein or may be part of an artificial reality system, such as artificial reality systems 10, 20 of FIGS. 1A, 1B.

In this example, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. The frame of reference may also be used in tracking the position and orientation of hand-held device 136 with respect to the HMD 112. In other examples, HMD 112 receive data from hand-held device 136 indicating the position and/or orientation of the hand-held device 136.

As further shown in FIG. 2A, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, IR scanners, laser scanners, Doppler radar scanners, depth scanners, or the like, configured to output image data representative of the physical environment. In some aspects, the image capture devices 138 can capture image data from a visible spectrum and an invisible spectrum of light (e.g., IR light). More specifically, image capture devices 138 capture image data representative of objects in the physical environment that are within a field of view 130A, 130B of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

In the example illustrated in FIG. 2A, hand-held device 136 comprises a peripheral device that coexists with HMD 112 and, in some examples, operates as an auxiliary input/output device for HMD 112 in the artificial reality environment. As discussed above, in some examples, the peripheral device may operate as an artificial reality co-processing device to which some of the functions of HMD 112 are offloaded. Surface 220 of hand-held device 136 is a touch-sensitive surface, such as a surface that uses capacitive, conductive, resistive, acoustic, or other technology to detect touch and/or hover input. In some examples, surface 220 of hand-held device 136 is a touchscreen. In such an example, hand-held device 136 may render a user interface on touchscreen 220 and detect user input (e.g., touch or hover input) on touchscreen 220. In that example, hand-held device 136 can communicate any detected user input to HMD 112 (and/or console 106 of FIG. 1A) using wireless communications links (e.g., Wi-Fi, near-field communication of short-range wireless communication such as Bluetooth), using wired communication links (not shown), or using other types of communication links. In some examples, hand-held device 136 can include one or more input devices 222 (e.g., buttons, trackball, scroll wheel) for interacting with virtual content (e.g., to select a virtual UI element, scroll through virtual UI elements etc.).

Figure 2B:
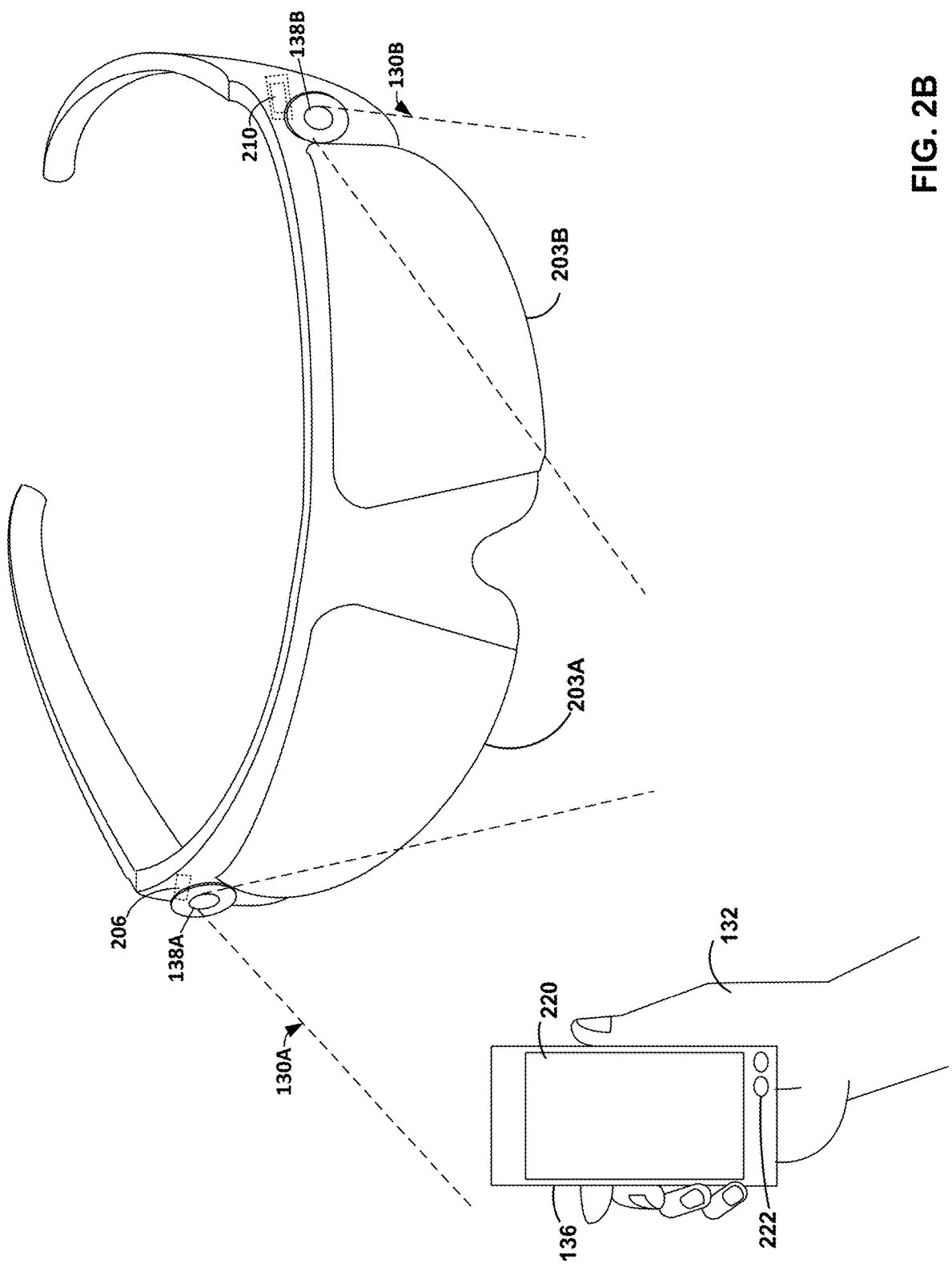
FIG. 2B is an illustration depicting another example HMD that operates in accordance with the techniques of the disclosure.

FIG. 2B is an illustration depicting an example HMD 112, in accordance with techniques of the disclosure. As shown in FIG. 2B, HMD 112 may take the form of glasses. HMD 112 of FIG. 2A may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In this example, HMD 112 are glasses comprising a front frame including a bridge to allow the HMD 112 to rest on a user's nose and temples (or "arms") that extend over the user's ears to secure HMD 112 to the user. In addition, HMD 112 of FIG. 2B includes interior-facing electronic displays 203A and 203B (collectively, "electronic displays 203") configured to present artificial reality content to the user. Electronic displays 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In the example shown in FIG. 2B, electronic displays 203 form a stereoscopic display for providing separate images to each eye of the user. In some examples, the known orientation and position of display 203 relative to the front frame of HMD 112 is used as a frame of reference, also referred to as a local origin, when tracking the position and orientation of HMD 112 for rendering artificial reality content according to a current viewing perspective of HMD 112 and the user.

As further shown in the example illustrated in FIG. 2B, HMD 112 further includes one or more motion sensors 206, such as one or more accelerometers (also referred to as inertial measurement units or "IMUS") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. HMD 112 includes an internal control unit 210, which may include an internal power source and one or more printed-circuit boards having one or more processors, memory, and hardware to provide an operating environment for executing programmable operations to process sensed data and present artificial reality content on display 203. In addition to HMD 112, the example illustrated in FIG. 2B includes a hand-held device 136, including a surface 220 and one or more input devices 222. The operation and configuration of hand-held device 136 may be the same as described above with reference to FIG. 2A.

Figure 3:
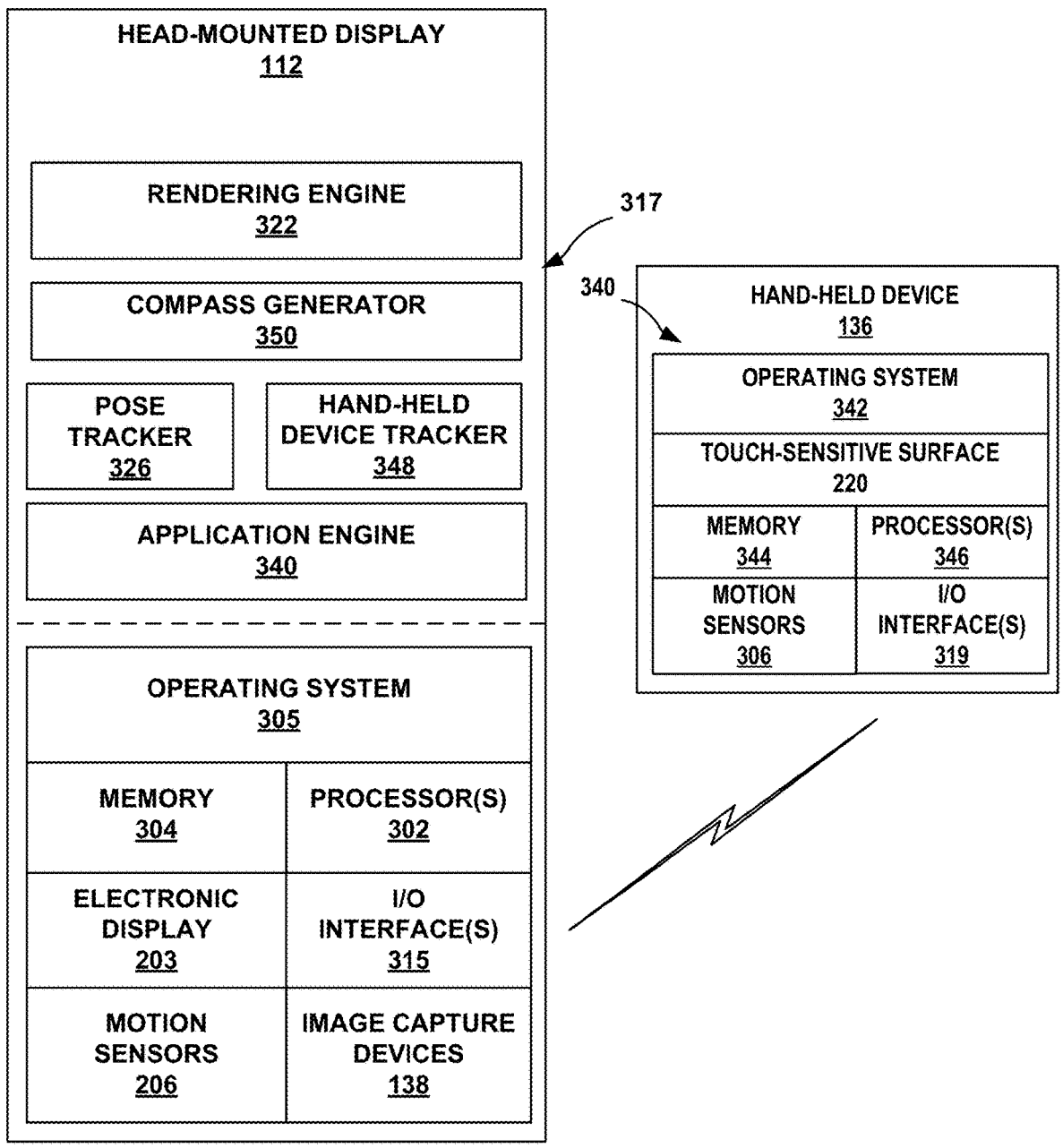
FIG. 3 is a block diagram depicting an example in which generating and displaying the proximity compass is performed by an example instance of the HMD of the artificial reality systems of FIGS. 1A, 1B in accordance with the techniques of the disclosure.

FIG. 3 is a block diagram showing example implementations HMD 112 and hand-held device 136 of artificial reality system 10, 20 of FIGS. 1A, 1B. In the example of FIG. 3, HMD 112 performs pose tracking and rendering for HMD 112 and hand-held device, such as motion data and image data received from HMD 112 and/or hand-held device 136. HMD 112 can generate a proximity compass using in accordance with the techniques described herein based on the sensed data and map data describing the location of virtual experiences and users within the artificial reality environment.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 317. Processors 302 are coupled to one or more I/O interfaces 315, which provide I/O interfaces for communicating with hand-held device 136 via similar I/O interfaces 319 and other devices such as a keyboard, game controllers, display devices, image capture devices, other HMDs, and the like. Moreover, the one or more I/O interfaces 315, 319 may include one or more wired or wireless network interface controllers (NICs) for communicating with a network, such as network 104 (FIGS. 1A, 1B). Additionally, processors 302 are coupled to electronic display 203, motion sensors 206, and image capture devices 138. In some examples, processors 302 and memory 304 may be separate, discrete components. In other examples, memory 304 may be on-chip memory collocated with processors 302 within a single integrated circuit.

Software applications 317 of HMD 112 operate to provide an overall artificial reality application. In this example, software applications 317 include application engine 340, rendering engine 322, pose tracker 326, hand-held device tracker 348, and compass generator 350.

In general, application engine 340 includes functionality to provide and present an artificial reality application, e.g., a GIF wall application, a teleconference application, a gaming application, a navigation application, an educational application, training or simulation applications, and the like. Application engine 340 may include, for example, one or more software packages, software libraries, hardware drivers, and/or Application Program Interfaces (APIs) for implementing an artificial reality application on HMD 112. Responsive to control by application engine 340, rendering engine 322 generates 3D artificial reality content for display to the user by application engine 340 of HMD 112.

Application engine 340 and rendering engine 322 construct the artificial content for display to user 110 in accordance with current pose information for HMD 112 and hand-held device 136 within a frame of reference, typically a viewing perspective of HMD 112, as determined by pose tracker 326 and hand-held device tracker 348. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112 and optionally controller measurement data received from hand-held device 136, such as movement information and user commands, and, in some examples, data from any external sensors 90 (FIGS. 1A, 1B), such as external cameras, to capture 3D information within the real-world environment, such as motion by user 110, and/or feature tracking information with respect to user 110. Based on the sensed data, pose tracker 326 determines a current pose for the HMD 112 within the frame of reference of HMD 112.

Additionally, hand-held device tracker 348 may determine a pose for the hand-held device 136. In some aspects, hand-held device tracker 348 may receive information from sensors on the hand-held device 136 and use the received information to determine a pose for the hand-held device 136. Such information may include information from motion sensors 306. Further, hand-held device tracker may use image data obtained via image capture devices 138 to determine a pose for the hand-held device 136.

The application engine 340 and rendering engine 322 may, in accordance with the current poses of the HMD 112 and hand-held device 136, construct and render artificial reality content for display to user 110.

Compass generator 350 may receive pose information for the HMD 112 and hand-held device 136 from hand-held device tracker 348 and use the information, along with map data 140 (FIG. 1) to generate a proximity compass 142. In some aspects, the compass generator 350 may determine if a proximity compass is to be generated based on satisfaction of various criteria. For example, the compass generator 350 may generate a proximity compass 142 upon determining that the hand-held device 136 is in the field of view of the HMD 112. Further, the compass generator 350 may generate the proximity compass 142 upon determining that the hand-held device 136 is in a compass enabling orientation. For example, the proximity compass 142 may be generated when the hand-held device is in a portrait orientation, and not generated if the hand-held device is not in a portrait orientation. The compass generator 350 may determine a direction and distance from the HMD 112 to locations of virtual experiences and the HMDs of other users using location information that is maintained in map data 140. The compass generator 450 may then determine positioning and optionally orientation of graphical elements within the proximity compass 142 based on the direction and location from the HMD 112 to the virtual experience and/or other user(s). The proximity compass 142 may then be provided to rendering engine 322 for rendering on the electronic display 203.

Hand-held device 136 may be a device that provides for user interaction with artificial reality system 10, 20. In the example illustrated in FIG. 3, hand-held device 136 includes one or more processors 346, memory 344, a touch sensitive surface 220, motion sensors 306, and I/O interface 319. The one or more processors 346 and memory 344 may provide a computer platform for executing an operating system 342, which may be an embedded, real-time multitasking operating system, for instance, or other type of operating system. In turn, operating system 346 provides a multitasking operating environment for executing one or more software components. In some examples, processors 346 and memory 344 may be separate, discrete components. In other examples, memory 344 may be on-chip memory collocated with processors 346 within a single integrated circuit.

In one or more aspects, hand-held device 136 may be configured to detect touch and/or hover input at touch-sensitive surface 220, process the input (e.g., at processors 346) and communicate the touch and/or hover input and communicate information about the input (including location information about that input) to console 106 and/or HMD 112. As further shown in FIG. 3, in this example, hand-held device 136 further includes one or more motion sensors 306, such as one or more accelerometers (also referred to as IMUs) that output data indicative of current acceleration of hand-held device 136, GPS sensors that output data indicative of a location or position of hand-held device 136, radar or sonar that output data indicative of distances of hand-held device 136 from various objects (e.g., from a wall or other surface), or other sensors that provide indications of a location, position, and/or orientation of hand-held device 136 or other objects within a physical environment.

As noted above, in some aspects, hand-held device 136 may be a proprietary hand-held device that is designed specifically for use with artificial reality system 10, 20. In such aspects, the touch sensitive surface 220 may be an input-only surface. That is, touch sensitive surface 220 may not have any display capability. In some aspects, hand-held device 136 may be a proprietary hand-held device that is designed specifically for use with artificial reality system 10, 20 where the touch sensitive surface 220 can be a touch-screen having both input and output capability. In further aspects, hand-held device 136 may be a smart phone having software enabling the smart phone to provide the functionality described above to an HMD 112 or console 106.

In one or more aspects, hand-held device 136 may coexist with the HMD 112 and, in some examples, operate as an auxiliary input/output device for the HMD in the virtual environment. In some examples, the hand-held device 136 may operate as an artificial reality co-processing device to which some of the functions of the HMD 112 or console 106 are offloaded.

Further details on the operation of pose tracker 326, hand-held device tracker 348, and compass generator 350 are provided below with respect to FIGS. 5-8.

Figure 4:
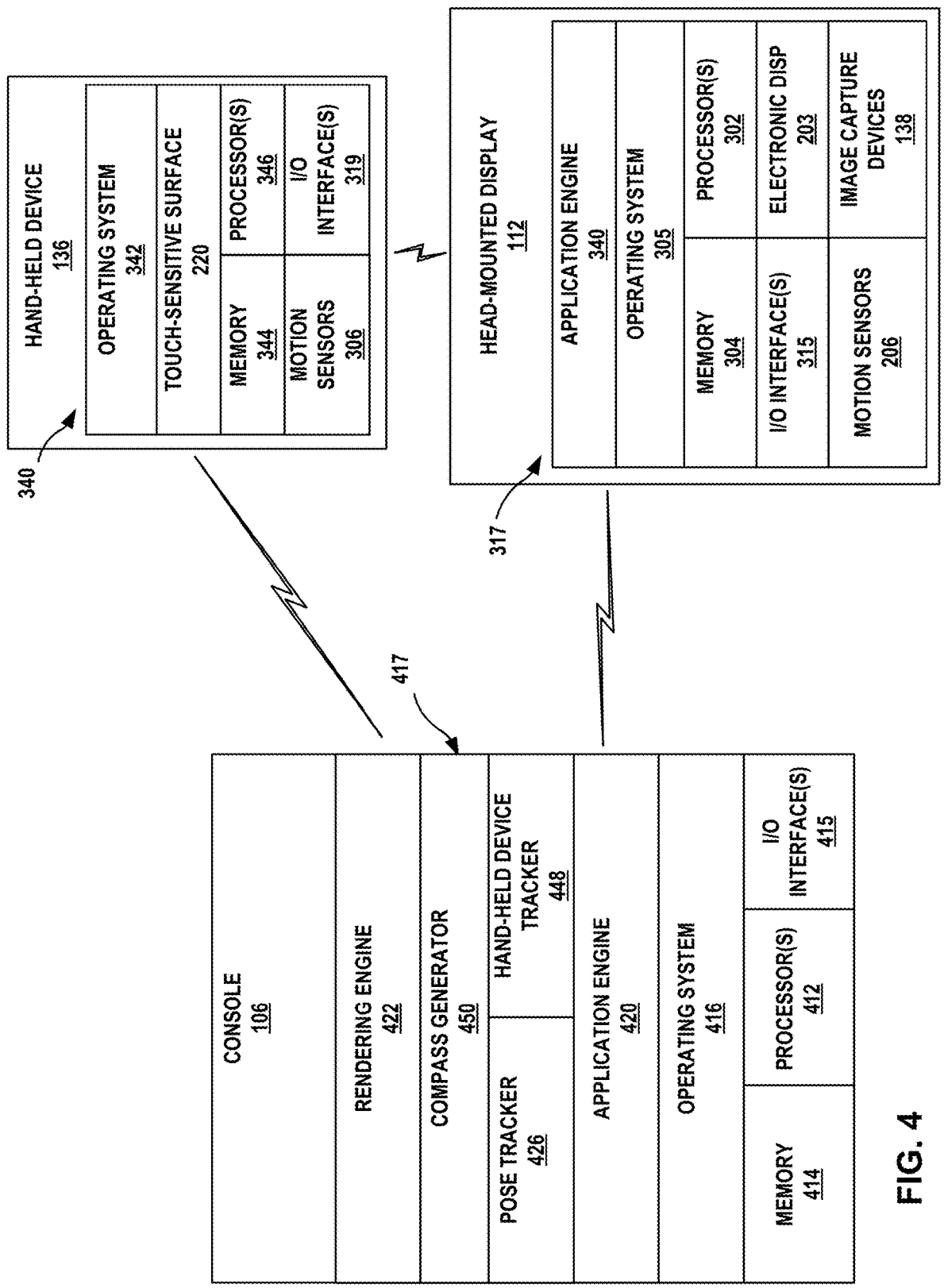
FIG. 4 is a block diagram showing example implementations in which generating and displaying the proximity compass is performed by example instances of the console and the HMD of the artificial reality systems of FIGS. 1A, 1B.

FIG. 4 is a block diagram showing example implementations of console 106, HMD 112, and hand-held device 136 of artificial reality system 10, 20 of FIGS. 1A, 1B. In the example of FIG. 4, console 106 performs pose tracking and rendering for HMD 112 in accordance with the techniques described herein based on sensed data, such as motion data received from an HMD 112 and/or hand-held device 136, and image data received from HMD 112 and/or external sensors.

In this example, similar to FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 317. Moreover, processor(s) 302 are coupled to electronic display 203, motion sensors 206, and image capture devices 138.

In general, console 106 is a computing device that processes image and tracking information received from cameras 102 (FIG. 1B) and/or HMD 112, and measurement data from hand-held device 136 to perform pose tracking, and content rendering for HMD 112 and hand-held device 136. In some examples, console 106 is a single computing device, such as a server, workstation, a desktop computer, a laptop, or gaming system. In some examples, at least a portion of console 106, such as processors 412 and/or memory 414, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 4, console 106 includes one or more processors 412 and memory 414 that, in some examples, provide a computer platform for executing an operating system 416, which may be an embedded, real-time multitasking operating system, for instance, or other type of operating system. In turn, operating system 416 provides a multitasking operating environment for executing one or more software components 417. Processors 412 are coupled to one or more I/O interfaces 415, which provide I/O interfaces for communicating with external devices, such as a keyboard, game controllers, display devices, image capture devices, HMDs, and the like. Moreover, the one or more I/O interfaces 415 may include one or more wired or wireless network interface controllers (NICs) for communicating with a network, such as network 104. Each of processors 302, 346, 412 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 344, 414 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Software applications 417 of console 106 operate to provide an overall artificial reality application. In this example, software applications 417 include application engine 420, rendering engine 422, pose tracker 426, hand-held device tracker 448, and compass generator 450. In general, application engine 420 includes functionality to provide and present an artificial reality application, e.g., a GIF wall application, a teleconference application, a gaming application, a navigation application, an educational application, training or simulation applications, and the like. Application engine 420 may include, for example, one or more software packages, software libraries, hardware drivers, and/or Application Program Interfaces (APIs) for implementing an artificial reality application on console 106. Responsive to control by application engine 420, rendering engine 422 generates 3D artificial reality content for display to the user by application engine 340 of HMD 112.

Additionally, hand-held device tracker 348 may determine a pose for the hand-held device 136. In some aspects, hand-held device tracker 348 may receive information from sensors on the hand-held device 136 and use the received information to determine a pose for the hand-held device 136. Such information may include information from motion sensors 306. Further, hand-held device tracker may use image data obtained via image capture devices 138 to determine a pose for the hand-held device 136.

Application engine 420 and rendering engine 422 construct the artificial content for display to user 110 in accordance with current pose information for HMD 112 and hand-held device 136 within a frame of reference, typically a viewing perspective of HMD 112, as determined by pose tracker 426 and hand-held device tracker 448. Based on the current viewing perspective, rendering engine 422 constructs the 3D, artificial reality content which may in some cases be overlaid, at least in part, upon the real-world 3D environment of user 110. During this process, pose tracker 426 operates on sensed data received from HMD 112 and hand-held device 136, such as image data from sensors on HMD 112, motion sensor data from hand-held device 136, and, in some examples, data from any external sensors 90 (FIGS. 1A, 1B), such as external cameras, to capture 3D information within the real-world environment, such as motion by user 110, motion of hand-held device 136, and/or feature tracking information with respect to user 110. Based on the sensed data, pose tracker 426 determines a current pose for the HMD 112 and the hand-held device 136 within the frame of reference of HMD 112 and, in accordance with the current poses, constructs the artificial reality content for communication, via the one or more I/O interfaces 315, 415, to HMD 112 for display to user 110.

Compass generator 450 may receive pose information for the HMD 112 from pose tracker 426 and pose information for hand-held device 136 from hand-held device tracker 448 and use the information, along with map data 140 (FIG. 1) to generate a proximity compass 142. As discussed above with respect to FIG. 3, in some aspects, the compass generator 450 may determine if a proximity compass is to be generated based on satisfaction of various criteria. For example, the compass generator 450 may generate a proximity compass 142 upon determining that the hand-held device 136 is in the field of view of the HMD 112. Further, the compass generator 450 may generate the proximity compass 142 upon determining that the hand-held device 136 is in a compass enabling orientation. For example, the proximity compass 142 may be generated when the hand-held device is in a portrait orientation, and not generated if the hand-held device is not in a portrait orientation. The compass generator 450 may determine a direction and distance from the HMD 112 to locations of virtual experiences and the HMDs of other users using location information that is maintained in map data 140. The compass generator 450 may then determine positioning and optionally orientation of graphical elements within the proximity compass 142 based on the direction and location from the HMD 112 to the virtual experience and/or other user(s). The proximity compass 142 may then be provided to rendering engine 422 for rendering on the electronic display 203.

Further details on the operation of pose tracker 426, hand-held device tracker 448, and compass generator 450 are provided below with respect to FIGS. 5-8.

Figure 5:
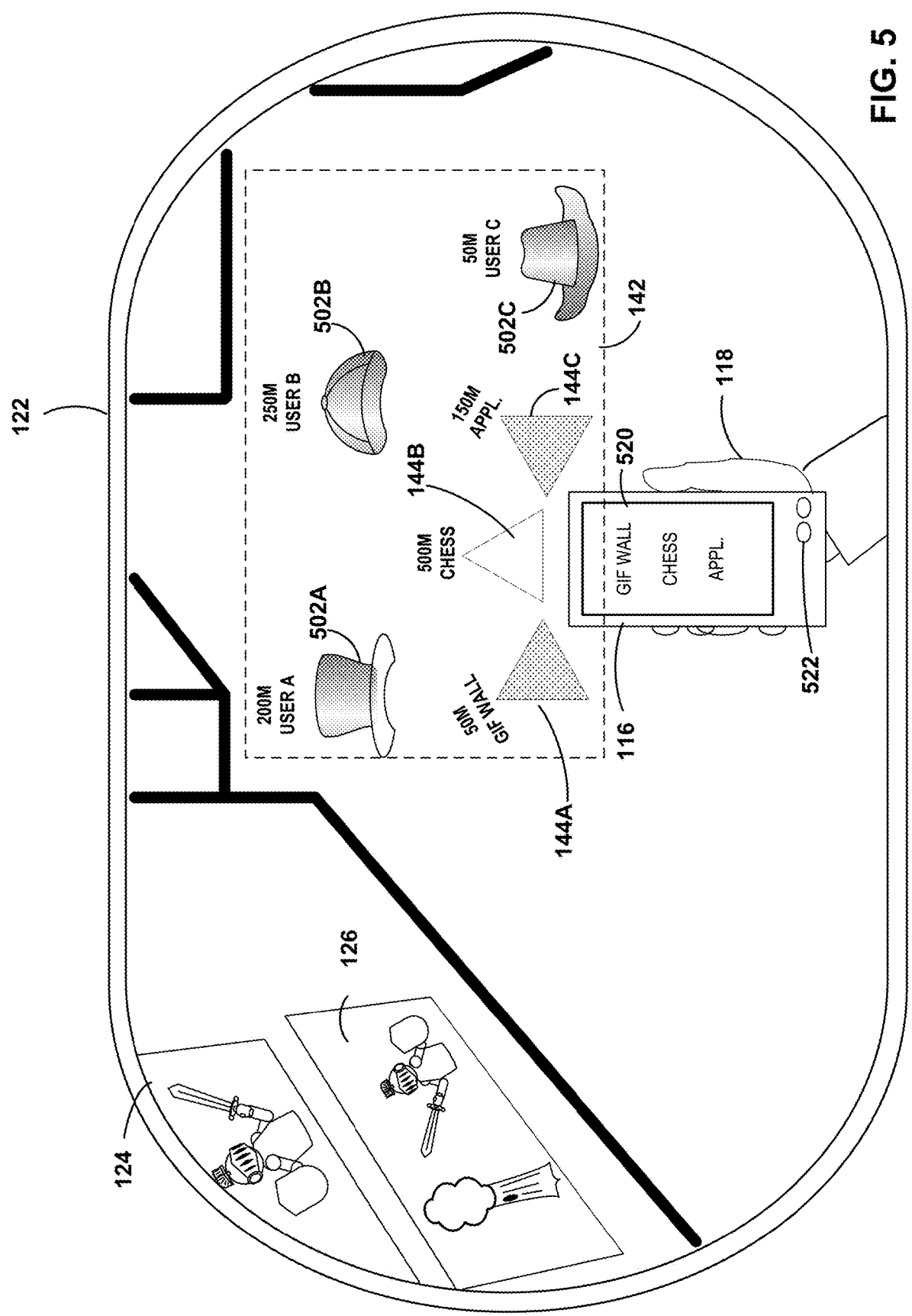
FIG. 5 illustrates example artificial reality content and an example proximity compass according to techniques of the disclosure.

FIG. 5 illustrates example artificial reality content 122 and an example proximity compass 142 according to techniques of the disclosure. In the example illustrated in FIG. 5, the touch-sensitive surface 220 of hand-held device 136 is represented in artificial reality content 122 as a virtual touch screen device 522 having one or more virtual input device 522. In this example, the proximity compass 142 includes graphical elements 144A, 144B and 144C that indicate a direction and distance from the HMD112 to virtual experiences comprising a GIF wall, a chess game, and an application. Further, the proximity compass 142 includes user graphical elements 502A, 502B and 502C corresponding to other users of the artificial reality system 10, 20. In some aspects, the virtual touch screen 520 overlaid on the surface of image 116 of hand-held device 136 can provide a user interface allowing a user to select, via virtual touchscreen 520 and/or virtual input device 522, one of the virtual experiences with which to interact. In further aspects where the touch-sensitive surface 220 of hand-held device 136 is a touchscreen, the virtual touch screen 520 may mirror some or all of an image presented on a touchscreen 220 of the hand-held device 136.

FIGS. 6A-6K illustrate various aspects of anchoring a proximity compass 142 and various examples of entities that can be pointed at by the proximity compass 142. The proximity compass 142 is shown in FIGS. 6A-6K as part of example artificial reality content 122 displayed on electronic display 203 of HMD 112.

Figure 6A:
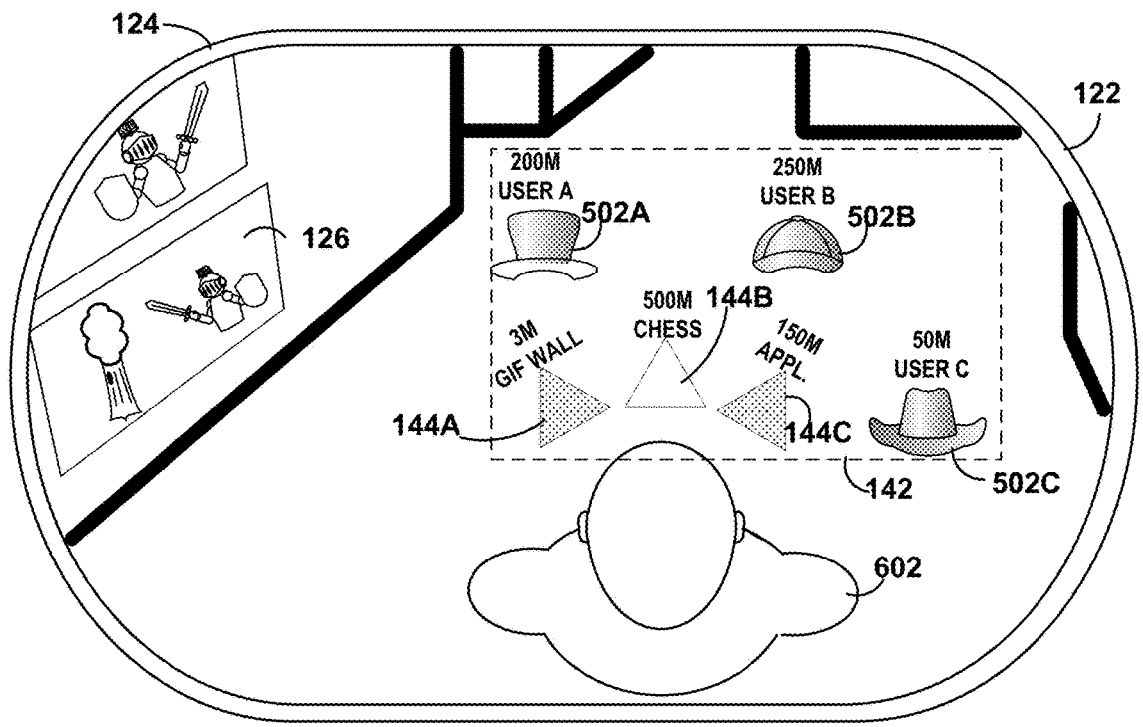
FIGS. 6A-6K illustrate example artificial reality content and example aspects of proximity compasses according to further techniques of the disclosure.

FIG. 6A illustrates example artificial reality content 122 and an example proximity compass 142 according to techniques of the disclosure. In previously presented aspects, artificial reality content 122 includes an image 118 of the user's hand 132 and an image 116 of hand-held device 136 where the proximity compass 142 is displayed in proximity to the image 116 of the hand-held device. For example, the proximity compass 142 may be rendered at a predefined or configurable distance from a position on the image 116 of the hand-held device 136 and thus can be anchored to the hand-held device 136. As illustrated in the example of FIG. 6A, the image 118 of the user's hand 132 and the image 116 of the hand-held device 136 are not included in the artificial reality content 122. In the illustrated example of FIG. 6A, an avatar 602 representing a user 110 is rendered and displayed with the artificial reality content 122. The proximity compass 142 is rendered in proximity to the avatar 602.

Figure 6B:
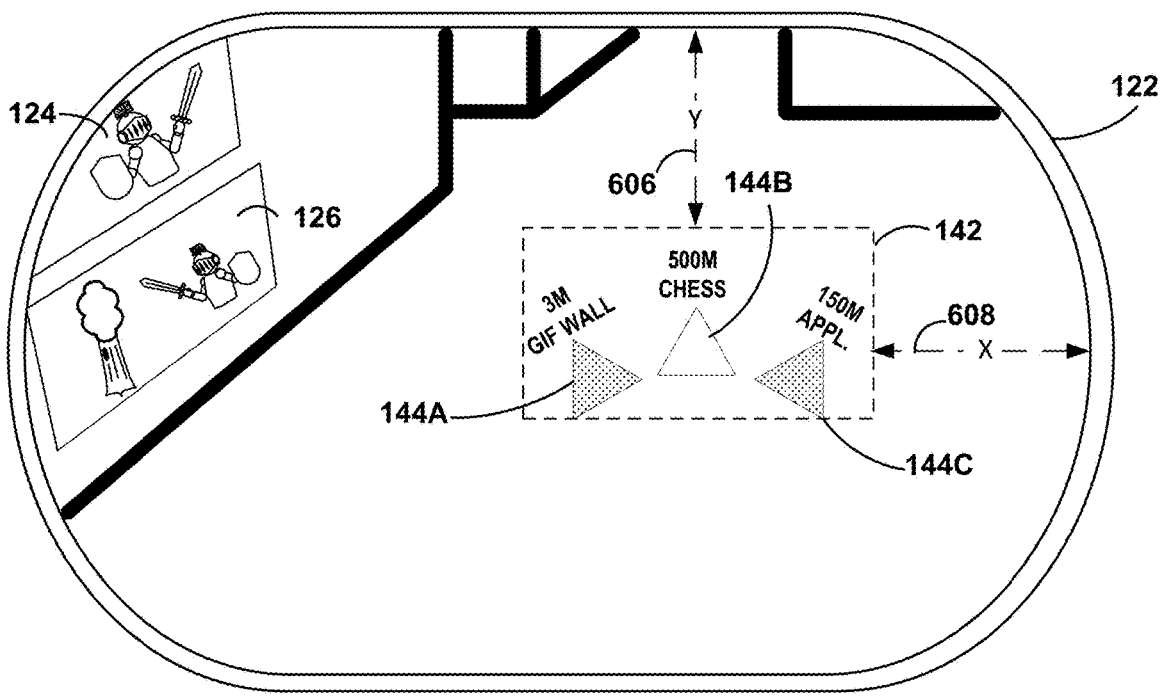

FIG. 6B illustrates an example implementation in which the proximity compass 142 is positioned at a predefined or configurable offset from an edge or other reference point of display 203 of HMD 112. In this example implementation, the proximity compass 142 can be rendered such that it is always in the user's field of view while the proximity compass 142 is active. In the example illustrated in FIG. 6B, the proximity compass 142 is anchored at an X distance 608 from the right side of display 203, and at a Y distance 606 from the top of the display 203. The rendering engine 322, 422 may render the proximity compass at the same X and Y offset from the edge of the display 203 of HMD 112 regardless of the pose of the HMD 112.

Figure 6C:
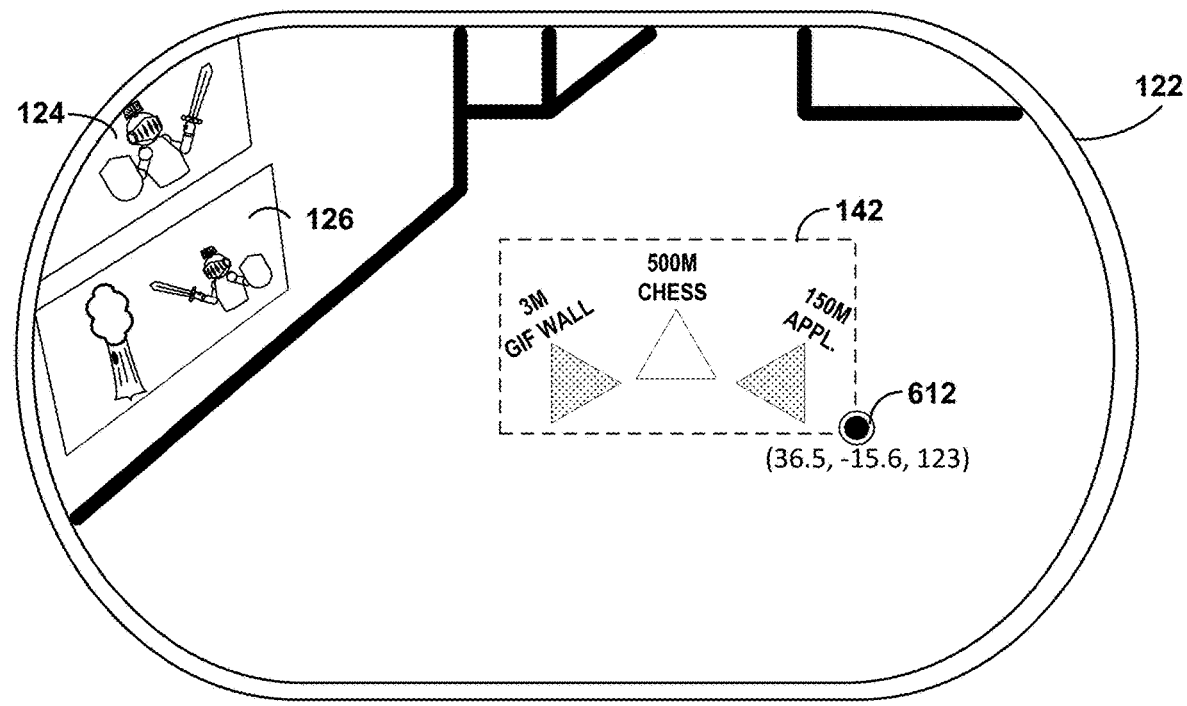
Figure 6D:
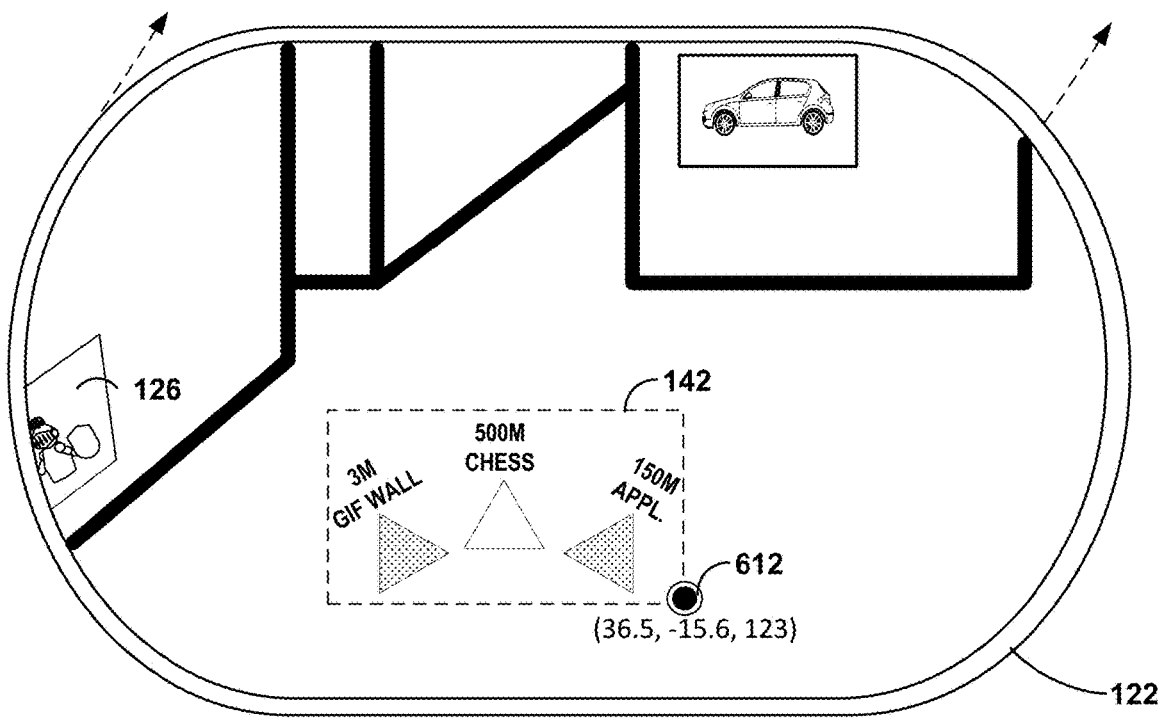

FIGS. 6C and 6D illustrate an example implementation in which the proximity compass 142 is anchored or docked at a fixed position in virtual or physical space. For example, the proximity compass can be anchored at a fixed X, Y, Z location. FIG. 6C illustrates a positioning of the proximity compass 142 at a fixed location 612 in physical space (e.g., X, Y, Z coordinates 36.5, −15.6, 123. FIG. 6C represent example content 122 that is presented on display 203 for a first pose of the HMD 112. FIG. 6D illustrates example content 122 that is presented on display 203 after the HMD 112 assumes a second pose. In the example illustrated in 6D, the HMD 112 has been moved in a position upward and to the right of the position of the HMD 112 in FIG. 6C, as indicated by the dashed line arrows. The proximity compass 142 remains at the same physical location 612 (36.5, −15.6, 123) and thus moves in the display 203 along with other physical and virtual objects in accordance with the change in the pose of HMD 112.

Figure 6E:
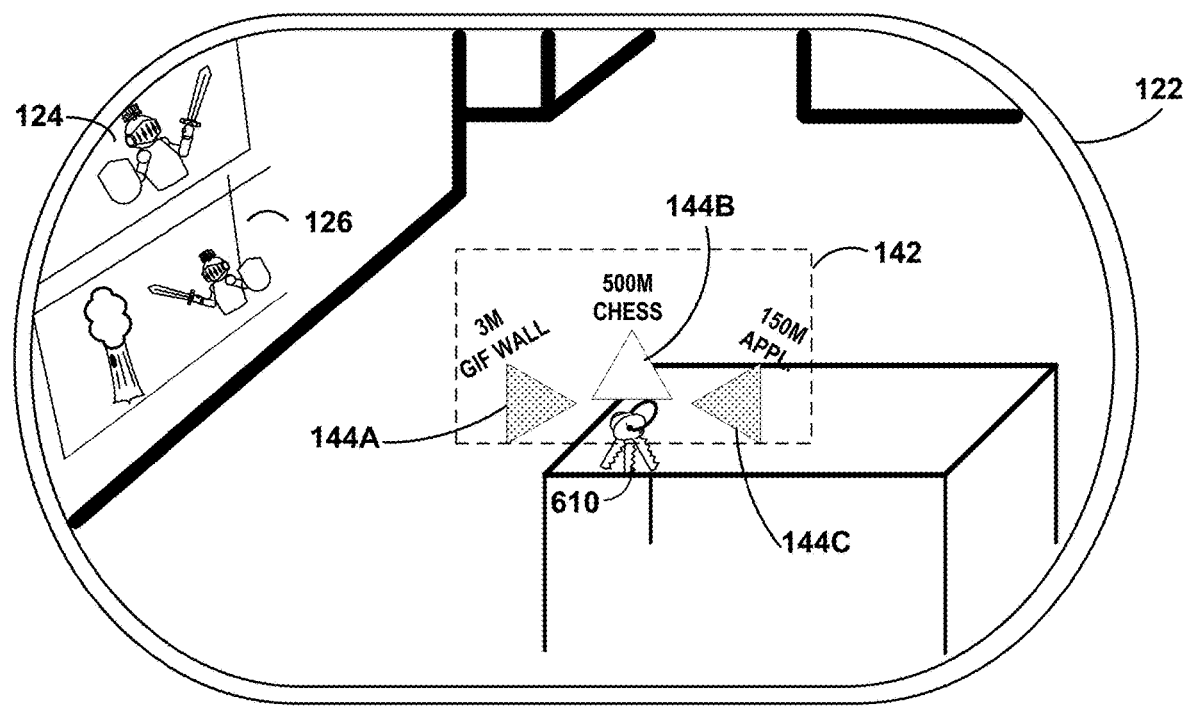
Figure 6F:
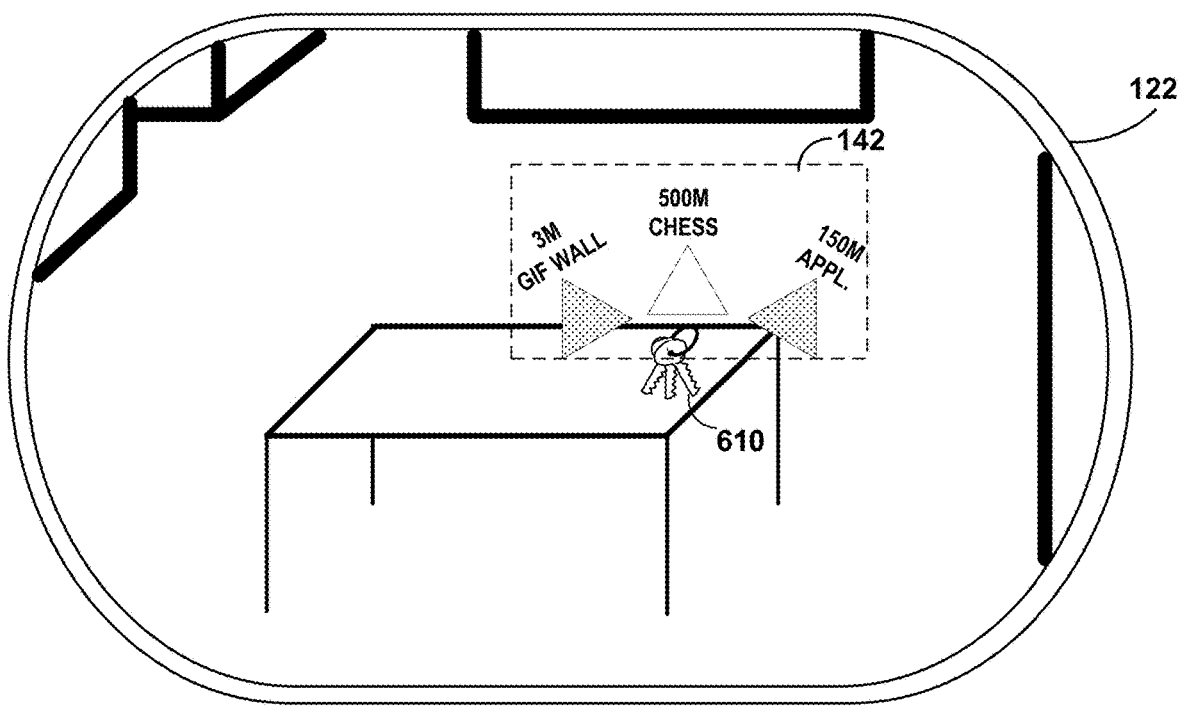

FIGS. 6E and 6F illustrate an example implementation in which the proximity compass 142 is anchored to an entity that is a trackable physical or virtual object. As the trackable object moves in physical or virtual space, the proximity compass 142 can also move with the trackable object. In the example illustrated in FIG. 6E, the proximity compass 142 is anchored to a tracked physical object comprising a set of keys 610 placed at the front left corner of a table. The table and the set of keys 610 may be physical objects, virtual objects, or a combination of virtual and physical objects. In the example illustrated in FIG. 6F, the set of keys 610 has been moved to the back right corner of the table. The proximity compass 142 can move in accordance with the physical or virtual object to which it is anchored. Thus, in the example illustrated in FIG. 6F, the virtual compass 142 is rendered by HMD 112 in proximity to the new position of the set of keys 610.

Figure 6G:
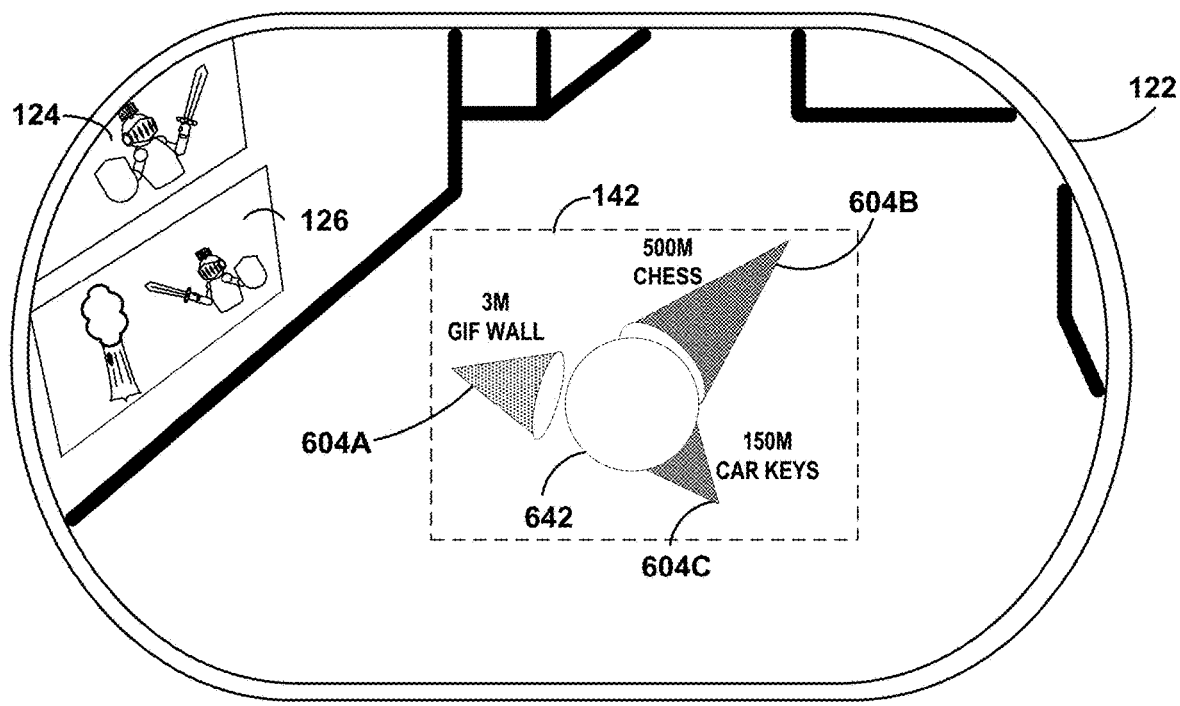
Figure 6H:
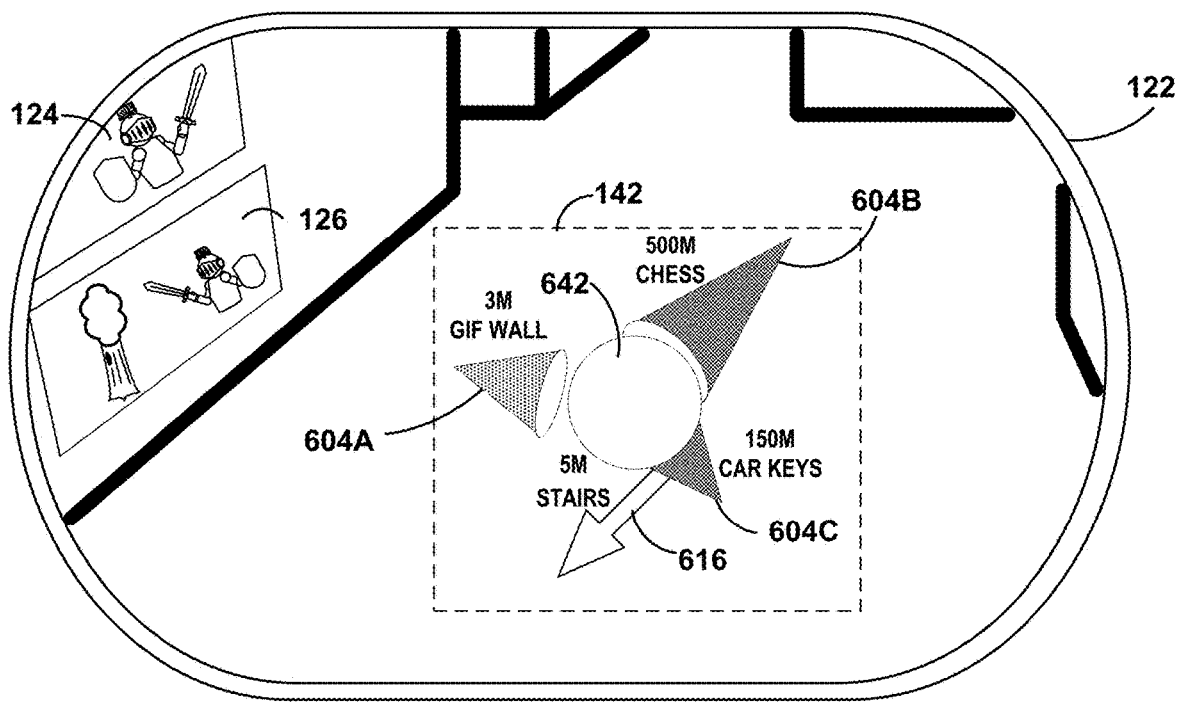

FIGS. 6G and 6H illustrate example implementations in which the proximity compass 142 includes three-dimensional (3D) graphical elements. FIG. 6G illustrates a 3D proximity compass 142 having a substantially centered sphere 642 and conical pointers 604A, 604B and 604C (referred to collectively as pointers 604). The 3D pointers 604 of the proximity compass 142 illustrated in FIG. 6G may provide an indication of elevation. For example, in FIG. 6G, pointers 604A and 604B are oriented substantially parallel to the floor in the artificial reality content 122, and thus indicate directions to target locations of entities on the same floor as the HMD 112. Pointer 604C points substantially downward and slightly to the right, indicating that the target location of the user's car keys is on a floor or other location that is below the current location of HMD 112. For example, the car keys may be located in the user's office which may be on a floor that is below the current location of HMD 112.

FIG. 6G also illustrates example implementations in which the proximity compass 142 indicates a direction (and optionally distance) to entities that are trackable objects (e.g., the user's car keys) that may move over the course of time and whose location can be tracked or detected. A trackable object may be a physical object or a virtual object. In some aspects, a pointer 604 may indicate a direction to a current location of a trackable object. In other aspects, a pointer 604 may indicate a trajectory of a trackable object. For example, the compass generator 350, 450 may predict a trajectory for a trackable object based on tracking information from sensors that can track the object, or by extrapolating from a history of position (and potentially orientation) information for the trackable object.

FIG. 6H illustrates an example implementation in which the proximity compass 142 displays either or both a pointer indicating a direction to an exact location of an entity and a direction to a known path to the same entity. The example illustrated in FIG. 6G continues the example illustrated in 6H where a pointer 604C indicates a direction to an exact location of the user's car keys. As indicated by the direction indicated by pointer 604C, the user's car keys are on a different floor than the user. In some aspects, a supplementary graphical element 616 may be included to indicate a direction to a known path to an entity. In the example illustrated in FIG. 6H, the supplementary graphical element 616 can be an arrow or other pointer that indicates a direction to stairs that would lead the user to the floor on which the car keys are located.

Figure 6I:
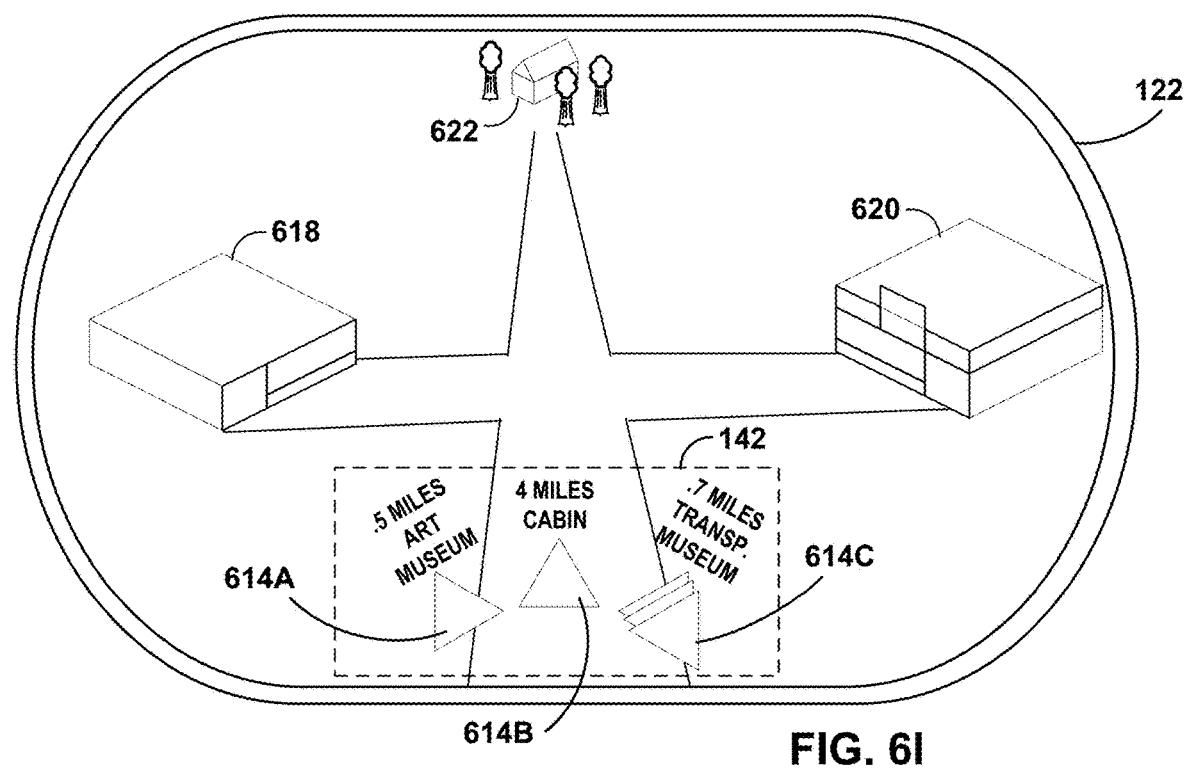
Figure 6J:
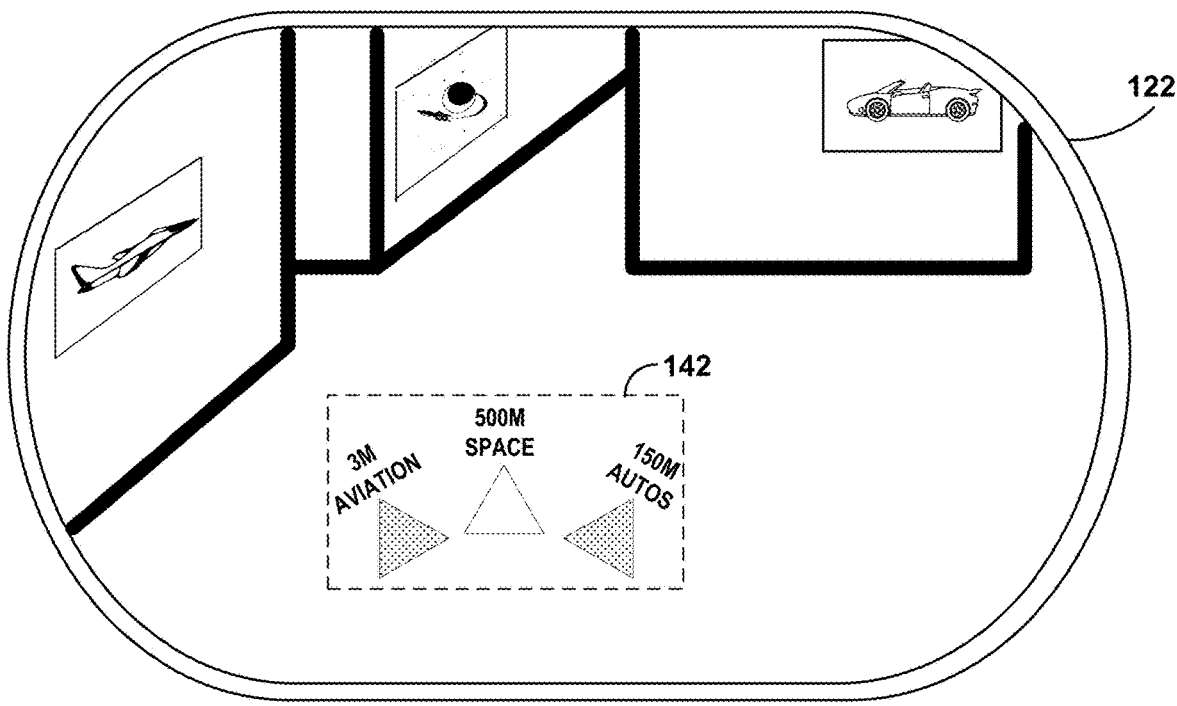

FIGS. 6I and 6J illustrate example implementations in which the proximity compass 142 includes graphical elements that comprise a group marker that points to a group of entities. In the example illustrated in FIG. 6I, proximity compass 142 includes graphical elements 614A, 614B and 614C that are markers that point to an art museum 618, a cabin 622, and a transportation museum 620, respectively. Graphical element 614C is a group marker. In some aspects, a group marker represents a group of entities. In implementations that support group markers, a graphical element (e.g., graphical element 614C) represents a group of entities that are in the indicated location. A group marker may be desirable in cases where displaying individual graphical elements for each entity would clutter the proximity compass 142 and/or result in a potential inability of the proximity compass 142 to display meaningful information to the user. In the example illustrated in FIG. 6I, graphical element 614C is rendered as a group of graphical elements overlaid upon one another. In some aspects, the number of overlaid graphical elements may represent the number of entities represented by the group marker. In other aspects, a group marker having overlaid graphical elements may indicate that there is more than one entity in the indicated direction, but the number of overlaid graphical elements may not necessarily correspond to the number of entities in the indicated direction. In particular, the number of entities represented by the overlaid graphical elements can be less than or greater than the number of overlaid graphical elements. For example, the proximity compass 142 may include a group marker that has three overlaid graphical elements thus indicating multiple entities are in the same direction as indicated by the graphical elements. However, the number of entities may not be three, but instead could be two or five (or any other number greater than three).

Other mechanisms for indicating groups of entities may be used. For example, in some aspects, a group marker may comprise a graphical element that has a numeral on or in proximity to the graphical element that can specify the number of entities in the direction indicated by the graphical element. In some aspects, a graphical element may be highlighted, color coded, outlined, or otherwise indicated to be a group marker.

FIG. 6J continues the example illustrated in FIG. 6I, and shows the proximity compass 142 after the user has arrived at a destination represented by the group marker 614C of FIG. 6I (e.g., the transportation museum 620). Upon arrival at a location represented by a group marker, the proximity compass 142 may be updated to reflect the entities at the location. In the example illustrated in FIG. 6J, when the user arrives at the transportation museum 620, the proximity compass 142 may be updated to remove the previous set of graphical elements that were displayed prior to arrival at the destination (e.g., those illustrated in FIG. 6I including group marker 614 C representing the transportation museum 620), and to add markers that indicate the direction (and optionally distance) to entities within the destination (e.g., transportation museum 620). As an example, upon the user's arrival at the transportation museum 620, the proximity compass 142 may be updated to indicate more particular locations within the transportation museum 620, including an aviation wing, a space travel wing, and an automobile wing of the museum.

As a further example, a proximity compass 142 may display graphical elements that indicate a direction (and optionally a distance) to a stadium. Upon arrival at the stadium, the proximity compass 142 may be updated to display graphical elements that indicate the direction and optionally distance to a popcorn stand, a beer stand, a souvenir stand, etc. within the stadium. As a still further example, a proximity compass 142 may display graphical elements that indicate a direction (and optionally a distance) to a grocery store. Upon arrival at the grocery store, the proximity compass 142 may be updated to display graphical elements that indicate the direction and optionally distance to a dairy section, meat section, bakery section drinks section, etc. within the grocery store.

As discussed above, some or all of the graphical elements of a proximity compass 142 may be replaced with different graphical elements upon a user arriving at a target location (e.g., a destination location). The artificial reality system may determine that an HMD 112 has arrived at a destination location in various ways. In some aspects, arrival at a target location may be determined in accordance with a distance from the HMD 112 to the target location. If the HMD 112 is within a threshold distance of the target location, the artificial reality system may determine that the user has arrived at the target location. The threshold distance may vary depending on the size of the target location. For example, if the target location is a stadium, the threshold distance may be larger than if the target location were a comparatively smaller location such as a small store or a room within an office building. The distance from the HMD 112 to a target location may be measured using various points of reference. In some aspects, the distance may be measured with respect to a center point of a target location. In some aspects, the distance may be measured with respect to an edge of the target location. As an example, in the case of a large structure (e.g., a stadium), the distance may be measured with respect to an entrance at the outer edge of the stadium. In such cases, the map data 140 may include data indicating the edges of a target location, or may include an approximation of the volumetric properties of the target location.

Additionally, FIGS. 6I and 6J illustrate example implementations in which the proximity compass 142 is comprised of graphical elements 144 alone and does not include a central compass element or object such as an anchor object (e.g., image 116 of the hand-held device 136, avatar 602, sphere 642, etc.).

Figure 6K:
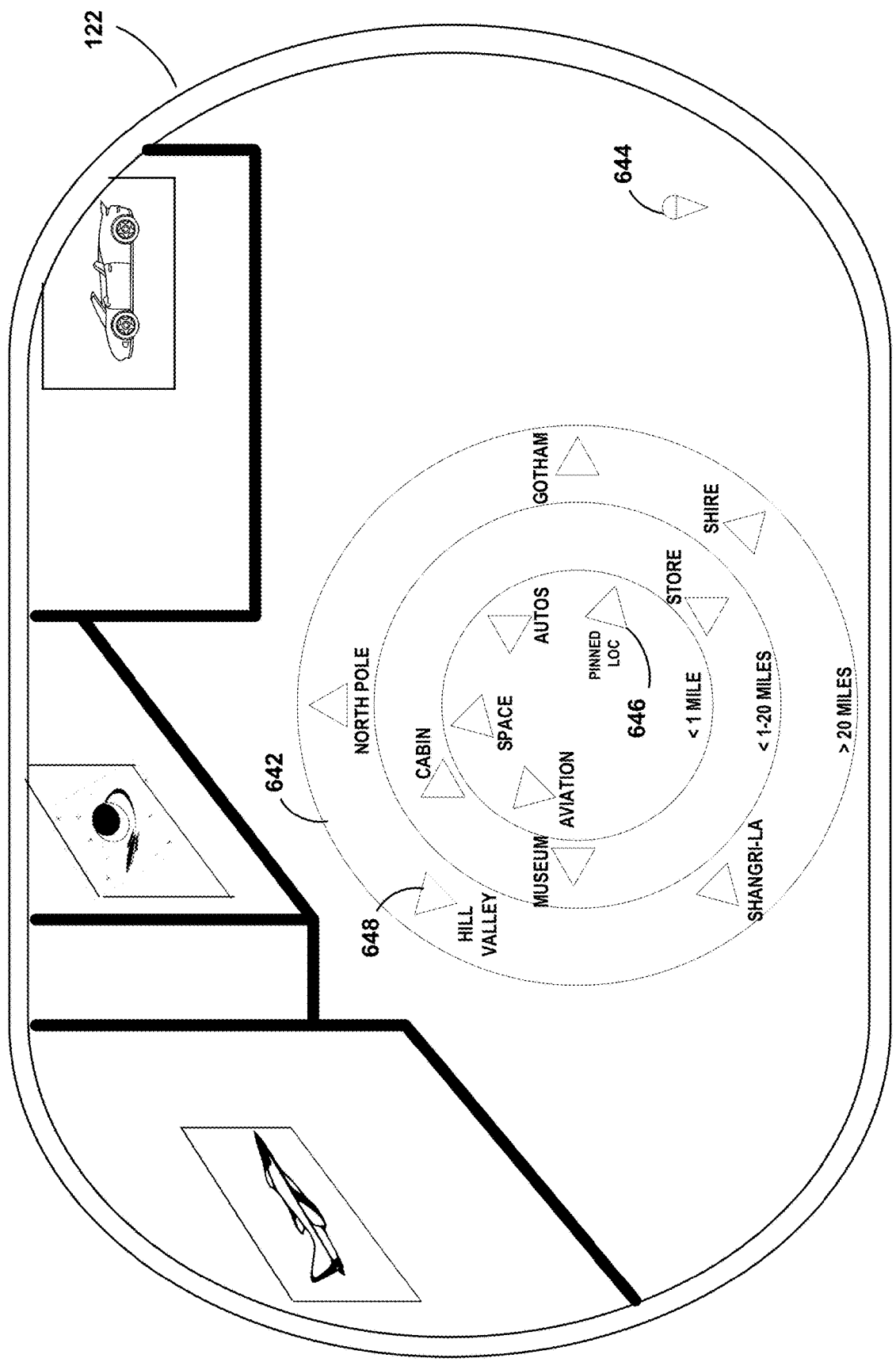

FIG. 6K illustrates an example proximity compass 642 according to some aspects of this disclosure. In the example, the proximity compass 642 includes multiple concentric rings. Graphical elements representing entities may be placed in a ring according to the distance and direction to an entity represented by the graphical element. For example, assume that a city named "Hill Valley" is fifty miles in a northwesterly direction from the current location of the HMD 112. The graphical element 648 representing Hill Valley is thus located in the outermost ring for entities that are more than twenty miles away from the current position of the HMD 112. Entities that are between one mile and twenty miles away from the current position of the HMD 112 are in the center ring of proximity compass 642. Entities that are located less than one mile away from the current position of HMD 112 may be placed in the inner most ring of proximity compass 642. In the example illustrated in FIG. 6K, the order of the concentric rings representing distance from the HMD 112 proceed from closest to furthest as the diameter of the concentric rings increase. In some aspects, the order may be reversed. That is, the order of the concentric rings may proceed from farthest to closest as the diameter of the rings increase.

As described above, the example proximity compass 642 illustrated in FIG. 6K uses concentric rings to indicate distance to a target location. In some aspects, other layered schemes may be used to define ranges of distances from a source location to various target locations.

Additionally, concentric rings or layers may be used to indicate other aspects in addition to, or instead of, distance to a target location. For example, a ring or layer may represent a ranking or priority associated with a target location in the ring or layer. In some aspects, rings or layers may indicate a type of target location. For instance, virtual experiences may be in one ring or layer, physical locations in another ring or layer, and locations of virtual experiences in still another ring or layer.

FIG. 6K also illustrates that entities may be particular locations that are specified by a user of an HMD 112. For example, a user may specify a 2D or 3D coordinate as a location entity. The reference system for the 2D or 3D coordinate may be relative to the user's HMD 112, or it may be relative to another coordinate system (e.g., latitude and longitude). In the example shown in FIG. 6K, a user has established a location entity referred to as a "pinned location" 644. Proximity compass 642 includes a graphical element 646 that indicates the direction to the pinned location 644.

Figure 7A:
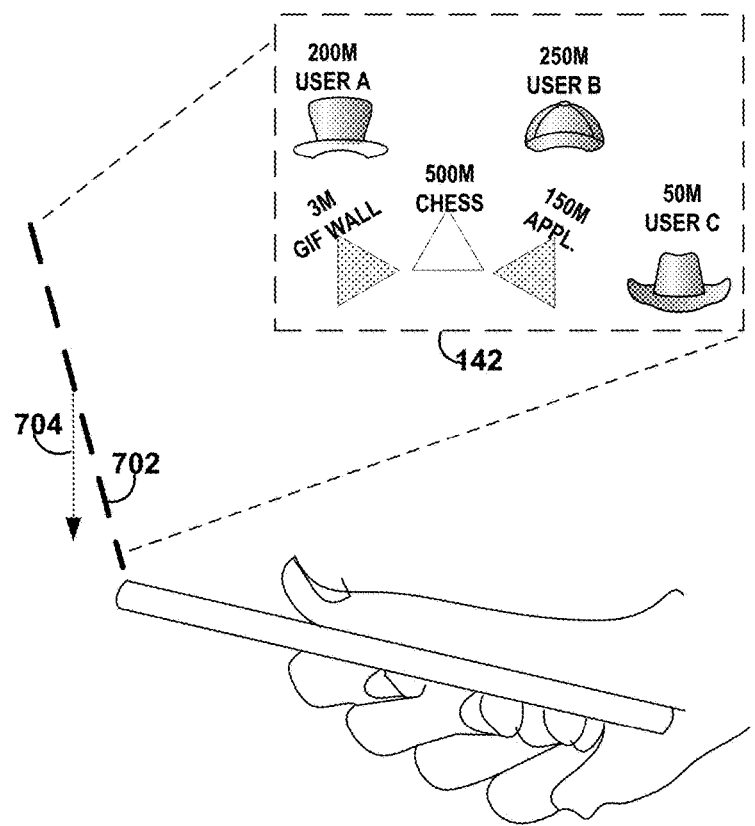
FIG. 7A illustrates an example display plane for an example proximity compass according to techniques of the disclosure.

FIG. 7A illustrates an example display plane 702 for a proximity compass 142 according to techniques of the disclosure. In some aspects, a compass generator 350, 450 determines a gravity vector 704 that may be based on accelerometer or other sensor data associated with HMD 112. The compass generator 350, 450 may determine a display plane 702 for the proximity compass 142 based on a predetermined or configurable angle with respect to the gravity vector. This can be desirable, because it can keep the proximity compass in an orientation that is viewable within the HMD 112 irrespective of the orientation of the HMD 112 or hand-held device 136. For example, even if the orientation of the HMD 112 or hand-held device 136 is not horizontal (e.g., the user is looking up or down, or holding the hand-held device in a vertical orientation), the display plane 702 of the proximity compass 142 may be rendered and displayed based on the gravity vector such that it is still viewable by the user.

Figure 7B:
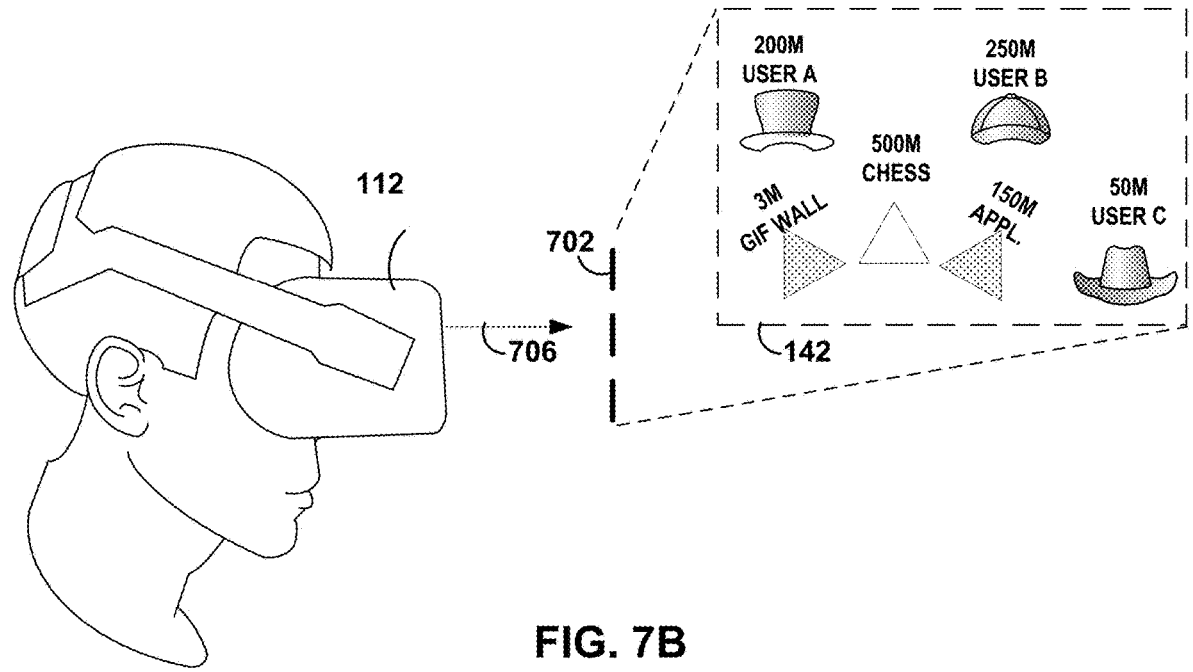
FIG. 7B illustrates a further example of a display plane for a proximity compass according to further techniques of the disclosure.

FIG. 7B illustrates a further example of a display plane 702 for a proximity compass according to further techniques of the disclosure. In the example illustrated in FIG. 7B, the display plane 702 can be determined according to a vector 706 that is perpendicular to the display of HMD 112. In this example, the display plane 702 can be rendered such that the proximity compass 142 always faces the HMD 112.

In addition to, or instead of, the examples illustrated in FIGS. 7A and 7B, the proximity compass 142 may be rendered in a position orientation that is determined according to an object to which the proximity compass 142 may be anchored.

Figure 8:
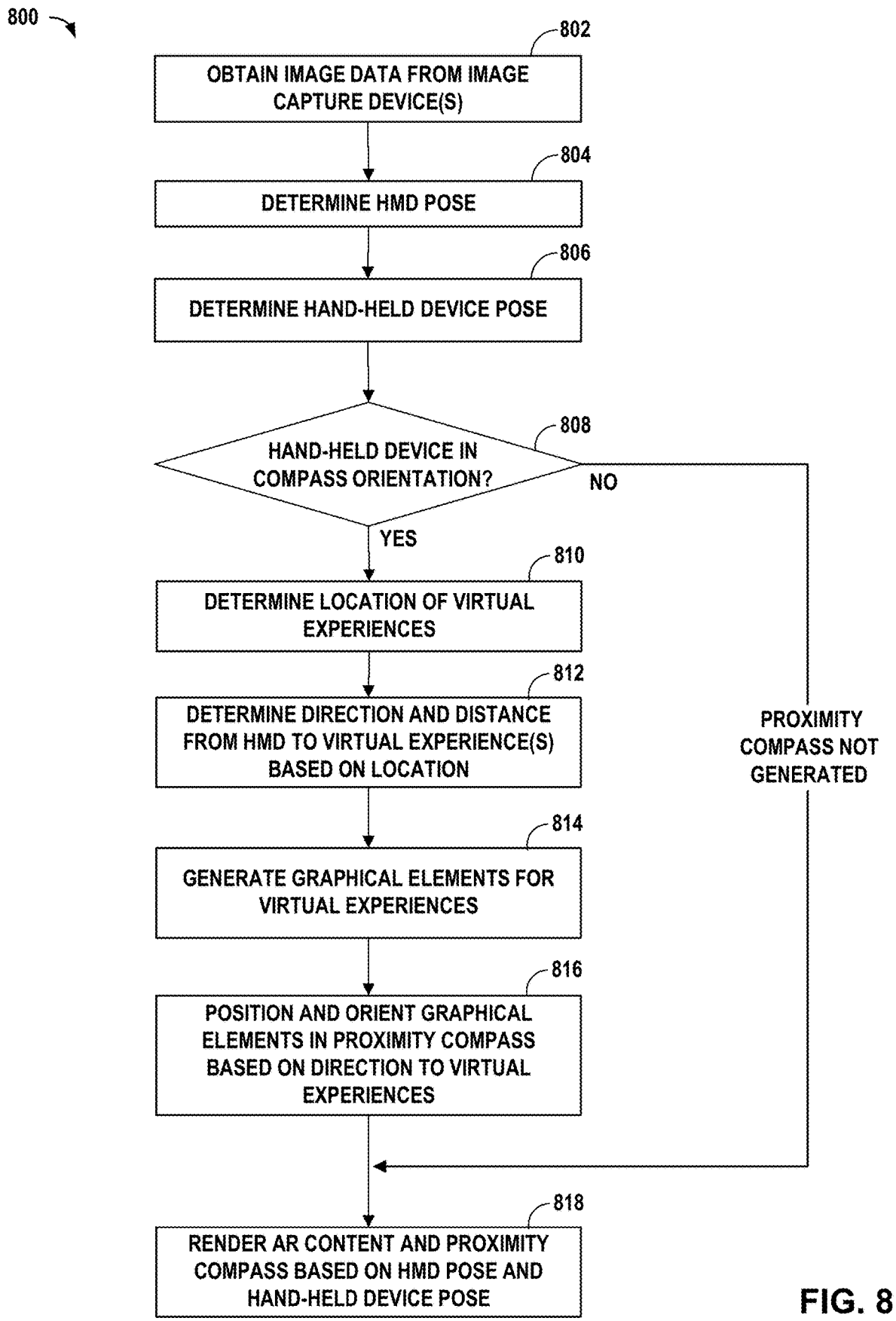
FIG. 8 is a flowchart illustrating example operations of a method for generating and displaying a proximity compass in accordance with aspects of the disclosure.

FIG. 8 is a flowchart illustrating example operations of a method for generating and displaying a proximity compass in accordance with aspects of the disclosure. The example operations described in flowchart 600 may be performed periodically or in response to an event. For example, the example operations may be performed as part of a response to a display frame generation event where the event causes an artificial reality system 10, 20 to render a display frame for presentation on HMD 112.

A pose tracker may receive image data from one or more image capture devices of an HMD (802). Additionally, the image data may optionally be obtained by cameras or sensors external to the HMD. The pose tracker may also receive motion sensor data from motion sensors of HMD and hand-held device. The pose tracker may determine a pose for the HMD using the image data and the sensor data (804). Additionally, a hand-held device tracker may determine a pose for the hand-held device from the image data received via the image capture devices and motion sensor data received from motion sensors on the hand-held device (806).

A compass generator may determine if a proximity compass is to be rendered and displayed on the HMD. The compass generator may generate the proximity compass based on satisfaction of one or more conditions. For example, in some aspects, a proximity compass is generated when the hand-held device is in a compass orientation. The compass orientation may be a portrait orientation in some implementation. If the hand-held device is not in a compass orientation, the compass generator may bypass generation of the proximity compass (NO branch of 808). Additionally, in some aspects, if the hand-held device is not in a compass orientation (e.g., the hand-held device is in a landscape orientation), the hand-held device may be placed in an input mode such that the hand-held device may be used to supply input to a virtual experience.

If the compass generator determines that a proximity compass is to be generated (YES branch of 808), the compass generator determines locations of virtual experiences and other users within the artificial reality environment (810). For example, the compass generator may obtain location data for virtual experiences and other users from map data maintained in a database associated with the artificial reality system. The compass generator may use the location data to determine a direction and distance from the HMD to the virtual experiences and other users (812). For example, the compass generator may obtain 3D physical environment location data for virtual experiences from map data maintained in a map database and translate the locations within the 3D physical environment to locations within the 3D virtual environment based on the frame of reference of the HMD. The compass generator can use the location data (translated as necessary) to compute the direction, and optionally distance, to the virtual experience. The compass generator may generate graphical elements associated with the virtual experiences and graphical elements associated with other users of the artificial reality system (814). For example, the compass generator may generate shapes, icons or other graphical elements representing the virtual experiences. The shapes, icons or other elements may be highlighted depending on whether the user can interact with the virtual experience. The compass generator may then determine positions for the graphical elements representing the virtual experiences and/or other users based on the direction from the HMD to the location of the virtual experiences and other users (816).

The rending engine may render the artificial reality content based on the HMD pose and hand-held device pose (818). Additionally, the rendering engine may render the proximity compass if the compass generator has generated a proximity compass.

The proximity compass has been generally described above as being used as an independent tool to indicate a direction to physical and virtual entities. In some aspects, the proximity compass may be integrated with an application. For example, the proximity compass may be integrated with a game application such as a treasure hunt or geocaching game, or a "hot/cold" type game. Thus, in some applications or games, the proximity compass may display only a direction (e.g., treasure hunt game) or only a distance (e.g., hot/cold game).

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head mounted device (HMD) connected to a host computer system, a standalone HMD, a mobile device or computing system, or any other hardware platform capable of providing artificial reality content to one or more viewers.

What is claimed is:
1. An artificial reality system comprising:
   a head mounted display (HMD) configured to output artificial reality content associated with a three-dimensional (3D) virtual environment;
   a pose tracker executable by one or more processors and configured to determine an HMD pose representing an estimated position and orientation of the HMD within a 3D physical environment;
   a hand-held device tracker executable by the one or more processors and configured to determine a hand-held device pose representing an estimated position and orientation of a hand-held device;
   a compass generator executable by the one or more processors and configured to:
      determine a direction from the estimated position of the HMD to a location within the 3D physical environment corresponding to a location of an entity within the 3D virtual environment,
      in response to a first determination that the hand-held device pose indicates a first orientation of the hand-held device, generate a proximity compass, the proximity compass comprising at least one graphical element associated with the entity, wherein at least one of a position or an orientation of the graphical element within the proximity compass is based on the direction, and in response to a second determination that the handheld device pose does not indicate the first orientation, bypass generation of the proximity compass; and a rendering engine executable by the one or more processors and configured to render, for presentation on a display device of the HMD, the artificial reality content based, at least in part, on the HMD pose;

wherein in response to the first determination that the hand-held device pose indicates the first orientation of the hand-held device, the compass generator determines a display position at which to generate the proximity compass based, at least in part, on the hand-held device pose and a position of an image corresponding to the hand-held device rendered for presentation on the display device of the HMD, and wherein the rendering engine renders the proximity compass for presentation on the display device of the HMD based on the hand-held device pose and the display position.

2. The artificial reality system of claim 1, wherein the proximity compass further comprises an indicator of a distance from the HMD to the location of the entity associated with the at least one graphical element.

3. The artificial reality system of claim 1, wherein the compass generator is further configured to generate a user graphical element associated with a second HMD, the user graphical element positioned within the proximity compass according to a direction from the estimated position of the HMD to an estimated position of the second HMD.

4. The artificial reality system of claim 3, wherein the compass generator is further configured to generate an indicator of a distance from the estimated position of the HMD to the estimated position of the second HMD.

5. The artificial reality system of claim 1, wherein the entity comprises a virtual experience, a virtual object, a physical object, a virtual location, or a physical location.

6. The artificial reality system of claim 1, wherein the entity comprises a movable virtual object or movable physical object, and wherein the compass generator updates the proximity compass in accordance with a current position of the movable virtual object or movable physical object.

7. The artificial reality system of claim 1, wherein the compass generator is further configured to determine a display plane for the proximity compass, wherein the at least one graphical element is rendered according to the display plane.

8. The artificial reality system of claim 7, wherein the display plane is determined in accordance with one or more of a gravity vector, a vector perpendicular to the display of the HMD, or a fixed orientation with respect to an anchor object.

9. The artificial reality system of claim 1, wherein the compass generator is further configured to apply a filter to the at least one graphical element based, at least in part, on a property of an entity associated with the at least one graphical element.

10. The artificial reality system of claim 9, wherein the property of the entity comprises a type of the entity, a selection of the entity, a distance of the entity from the HMD, or a preference associated with the entity.

11. The artificial reality system of claim 1, wherein a first graphical element of the proximity compass represents a first target location having a second target location within the first target location, and wherein the compass generator is further configured to:

determine whether the HMD is within a threshold distance of the first target location; and replace the first graphical element in the proximity compass with a second graphical element representing the second target location.

12. The artificial reality system of claim 1, wherein the location within the 3D physical environment corresponding to the location of the entity within the 3D virtual environment comprises a predicted location of the entity based on a trajectory of the entity.

13. The artificial reality system of claim 1, wherein the at least one graphical element indicates an elevation of the entity.

14. The artificial reality system of claim 1, wherein the compass generator is further configured to determine a direction from the estimated position of the HMD to a position on a path to the entity within the 3D virtual environment.

15. The artificial reality system of claim 1, wherein entity comprises a virtual experience, and wherein the compass generator is further configured to highlight the at least one graphical element based, at least in part, on a determination that a user can interact with the virtual experience associated with the at least one graphical element via the HMD or the hand-held device.

16. The artificial reality system of claim 1, wherein the hand-held device tracker is further configured to determine the hand-held device pose based, at least in part, on sensor data received from the hand-held device.

17. The artificial reality system of claim 1, wherein the hand-held device is further configured to operate as a user input device of the artificial reality system in response to a third determination that the hand-held device pose indicates a second orientation of the hand-held device that is different than the first orientation.

18. The artificial reality system of claim 1, wherein the hand-held device is further configured to operate as a user input device of the artificial reality system in response to a determination that the at least one graphical element associated with the entity has been selected.

19. The artificial reality system of claim 1, further comprising an image capture device configured to capture image data representative of the 3D physical environment;

wherein the hand-held device tracker is configured to determine the hand-held device pose based, at least in part, on the image data.

20. The artificial reality system of claim 1, wherein the hand-held device comprises one of a screenless peripheral device having a touch sensitive surface or a smartphone.

21. A method comprising:

determining, by a pose tracker of an artificial reality system including a head mounted display (HMD) configured to output artificial reality content associated with a three-dimensional (3D) virtual environment, an HMD pose representing an estimated position and orientation of the HMD within a 3D physical environment;

determining, by a hand-held device tracker of the artificial reality system, a hand-held device pose representing an estimated position and orientation of a hand-held device;

in response to a first determination that the hand-held device pose indicates a first orientation of the hand-held device:

determining, by a compass generator of the artificial reality system, a direction from the estimated position of the HMD to a location within the 3D physical environment corresponding to a location of an entity within the 3D virtual environment, determining, by the compass generator, a display position at which to generate the proximity compass based, at least in part, on the hand-held device pose and the position of an image corresponding to the hand-held device in a display device of the HMD, and generating, by the compass generator, a proximity compass, the proximity compass comprising at least one graphical element, wherein at least one of a position or an orientation of the graphical element within the proximity compass is based on the direction;

in response to a second determination that the hand-held device pose does not indicate the first orientation, bypassing generation of the proximity compass;

rendering, by a rendering engine of the artificial reality system for presentation on the display device of the HMD, the artificial reality content based, at least in part, on the HMD pose; and rendering, by the rendering engine of the artificial reality system for presentation on the display device of the HMD, the proximity compass based on the display position and the hand-held device pose in response to the first determination that the hand-held device pose indicates the first orientation of the hand-held device.

22. The method of claim 21, further comprising generating a user graphical element associated with a second HMD, the user graphical element positioned within the proximity compass according to a direction from the estimated position of the HMD to an estimated position of the second HMD.

23. The method of claim 21, further comprising highlighting the at least one graphical element based, at least in part, on determining that a user can interact with the entity associated with the at least one graphical element via the HMD or the hand-held device.

24. The method of claim 21, further comprising determining the hand-held device pose based, at least in part, on sensor data received from the hand-held device.

25. A non-transitory, computer-readable medium comprising instructions that, when executed, cause one or more processors of an artificial reality system including a head mounted display (HMD) to:

determine artificial reality content associated with a three-dimensional (3D) virtual environment;

determine an HMD pose representative of an estimated position and orientation of the HMD within a 3D physical environment;

determine a hand-held device pose representing an estimated position and orientation of a hand-held device;

in response to a first determination that the hand-held device pose indicates a first orientation of the hand-held device, determine a direction from the estimated position of the HMD to a location within the 3D physical environment corresponding to a location of an entity within the 3D virtual environment, determine a display position at which to generate the proximity compass based, at least in part, on the hand-held device pose and the position of an image corresponding to the hand-held device in a display device of the HMD, generate a proximity compass, the proximity compass comprising at least one graphical element, wherein at least one of a position or orientation of the graphical element within the proximity compass is based on the direction;

in response to a second determination that the hand-held device pose does not indicate the first orientation, bypass generation of the proximity compass;

render, for presentation on the display device of the HMD, the artificial reality content based, at least in part, on the HMD pose; and render, for presentation on the display device of the HMD, the proximity compass based on the display position and the hand-held device pose in response to the first determination that the hand-held device pose indicates the first orientation of the hand-held device.

26. The non-transitory, computer-readable medium of claim 25, wherein the instructions, when executed, further cause the one or more processors to:

generate a user graphical element associated with a second HMD, the user graphical element positioned within the proximity compass according to a direction from the estimated position of the HMD to an estimated position of the second HMD.

27. The non-transitory, computer-readable medium of claim 25, wherein the instructions, when executed, cause the one or more processors to:

highlight the at least one graphical element based, at least in part, on determining that a user can interact with the entity associated with the at least one graphical element via the HMD or the hand-held device.

* * * * *